US010979322B2

(12) United States Patent
Kulshreshtha et al.

(10) Patent No.: US 10,979,322 B2
(45) Date of Patent: Apr. 13, 2021

(54) TECHNIQUES FOR DETERMINING NETWORK ANOMALIES IN DATA CENTER NETWORKS

(71) Applicant: Cisco Technology, Inc., San Jose, CA (US)

(72) Inventors: Ashutosh Kulshreshtha, Fremont, CA (US); Navindra Yadav, Cupertino, CA (US); Hai Trong Vu, San Jose, CA (US); Michael Standish Watts, Mill Valley, CA (US); Jackson Ngoc Ki Pang, Sunnyvale, CA (US); Khawar Deen, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 278 days.

(21) Appl. No.: 15/135,344

(22) Filed: Apr. 21, 2016

(65) Prior Publication Data

US 2016/0359592 A1    Dec. 8, 2016

Related U.S. Application Data

(60) Provisional application No. 62/171,899, filed on Jun. 5, 2015.

(51) Int. Cl.
*H04L 12/26* (2006.01)
*H04L 29/06* (2006.01)
(Continued)

(52) U.S. Cl.
CPC .......... *H04L 43/045* (2013.01); *G06F 3/0482* (2013.01); *G06F 3/04842* (2013.01);
(Continued)

(58) Field of Classification Search
CPC .... H04L 43/00; H04L 43/022; H04L 43/0829
(Continued)

(56) References Cited

U.S. PATENT DOCUMENTS 5,086,385 A    2/1992    Launey et al.
5,319,754 A    6/1994    Meinecke et al.
(Continued)

FOREIGN PATENT DOCUMENTS

CN    101093452    12/2007
CN    101770551    7/2010
(Continued)

OTHER PUBLICATIONS

Lab SKU; "VMware Hands-on Labs—HOL-SDC-1301;" Version: Mar. 21, 2014-Jul. 9, 2016; 2013; http://docs.hol.vmware.com/HOL-2013/hol-sdc-1301_html_en/; Uploaded in 2 parts.
(Continued)

*Primary Examiner* — Parth Patel
*Assistant Examiner* — Berhanu D Belete
(74) *Attorney, Agent, or Firm* — Polsinelli PC

(57) ABSTRACT

A monitoring device/module monitors a plurality of nodes in a data center network, and determines one or more latency distributions of response times for messages exchanged between pairs of nodes of the plurality of nodes. The network monitoring device determines a network topology, including one or more communication links interconnecting nodes of the plurality of nodes, consistent with the one or more latency distributions. The network monitoring device also determines a representative response time for each communication link based on the one or more latency distributions, and compares a current response time a message exchanged between one pair of nodes to the representative response time for the communication link interconnecting the one pair of nodes. The network monitoring
(Continued)

device identifies a network anomaly when the current response time deviates from the representative response time for the communication link interconnecting the one pair of nodes by a threshold amount.

20 Claims, 13 Drawing Sheets

(51) Int. Cl.

| | |
|---|---|
| *G06F 9/455* | (2018.01) |
| *G06N 20/00* | (2019.01) |
| *G06F 21/55* | (2013.01) |
| *G06F 21/56* | (2013.01) |
| *G06F 16/28* | (2019.01) |
| *G06F 16/2457* | (2019.01) |
| *G06F 16/248* | (2019.01) |
| *G06F 16/29* | (2019.01) |
| *G06F 16/16* | (2019.01) |
| *G06F 16/17* | (2019.01) |
| *G06F 16/11* | (2019.01) |
| *G06F 16/13* | (2019.01) |
| *G06F 16/174* | (2019.01) |
| *G06F 16/23* | (2019.01) |
| *G06F 16/9535* | (2019.01) |
| *G06N 99/00* | (2019.01) |
| *H04L 9/32* | (2006.01) |
| *H04L 12/24* | (2006.01) |
| *H04L 12/715* | (2013.01) |
| *H04L 12/723* | (2013.01) |
| *H04L 29/08* | (2006.01) |
| *H04L 12/851* | (2013.01) |
| *H04W 84/18* | (2009.01) |
| *G06F 21/53* | (2013.01) |
| *G06F 3/0484* | (2013.01) |
| *H04L 1/24* | (2006.01) |
| *H04W 72/08* | (2009.01) |
| *H04L 9/08* | (2006.01) |
| *H04J 3/06* | (2006.01) |
| *H04J 3/14* | (2006.01) |
| *H04L 29/12* | (2006.01) |
| *H04L 12/813* | (2013.01) |
| *H04L 12/823* | (2013.01) |
| *H04L 12/801* | (2013.01) |
| *H04L 12/741* | (2013.01) |
| *H04L 12/833* | (2013.01) |
| *H04L 12/721* | (2013.01) |
| *G06F 3/0482* | (2013.01) |
| *G06T 11/20* | (2006.01) |
| *H04L 12/841* | (2013.01) |
| *H04L 12/725* | (2013.01) |

(52) U.S. Cl.
CPC ...... *G06F 3/04847* (2013.01); *G06F 9/45558* (2013.01); *G06F 16/122* (2019.01); *G06F 16/137* (2019.01); *G06F 16/162* (2019.01); *G06F 16/17* (2019.01); *G06F 16/173* (2019.01); *G06F 16/174* (2019.01); *G06F 16/1744* (2019.01); *G06F 16/1748* (2019.01); *G06F 16/235* (2019.01); *G06F 16/2322* (2019.01); *G06F 16/2365* (2019.01); *G06F 16/248* (2019.01); *G06F 16/24578* (2019.01); *G06F 16/285* (2019.01); *G06F 16/288* (2019.01); *G06F 16/29* (2019.01); *G06F 16/9535* (2019.01); *G06F 21/53* (2013.01); *G06F 21/552* (2013.01); *G06F 21/566* (2013.01); *G06N 20/00* (2019.01); *G06N 99/00* (2013.01); *G06T 11/206* (2013.01); *H04J 3/0661* (2013.01); *H04J 3/14* (2013.01); *H04L 1/242* (2013.01); *H04L 9/0866* (2013.01); *H04L 9/3239* (2013.01); *H04L 9/3242* (2013.01); *H04L 41/046* (2013.01); *H04L 41/0668* (2013.01); *H04L 41/0803* (2013.01); *H04L 41/0806* (2013.01); *H04L 41/0816* (2013.01); *H04L 41/0893* (2013.01); *H04L 41/12* (2013.01); *H04L 41/16* (2013.01); *H04L 41/22* (2013.01); *H04L 43/02* (2013.01); *H04L 43/04* (2013.01); *H04L 43/062* (2013.01); *H04L 43/08* (2013.01); *H04L 43/0805* (2013.01); *H04L 43/0811* (2013.01); *H04L 43/0829* (2013.01); *H04L 43/0841* (2013.01); *H04L 43/0858* (2013.01); *H04L 43/0864* (2013.01); *H04L 43/0876* (2013.01); *H04L 43/0882* (2013.01); *H04L 43/0888* (2013.01); *H04L 43/10* (2013.01); *H04L 43/106* (2013.01); *H04L 43/12* (2013.01); *H04L 43/16* (2013.01); *H04L 45/306* (2013.01); *H04L 45/38* (2013.01); *H04L 45/46* (2013.01); *H04L 45/507* (2013.01); *H04L 45/66* (2013.01); *H04L 45/74* (2013.01); *H04L 47/11* (2013.01); *H04L 47/20* (2013.01); *H04L 47/2441* (2013.01); *H04L 47/2483* (2013.01); *H04L 47/28* (2013.01); *H04L 47/31* (2013.01); *H04L 47/32* (2013.01); *H04L 61/2007* (2013.01); *H04L 63/0227* (2013.01); *H04L 63/0263* (2013.01); *H04L 63/06* (2013.01); *H04L 63/0876* (2013.01); *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01); *H04L 63/16* (2013.01); *H04L 63/20* (2013.01); *H04L 67/10* (2013.01); *H04L 67/1002* (2013.01); *H04L 67/12* (2013.01); *H04L 67/16* (2013.01); *H04L 67/36* (2013.01); *H04L 67/42* (2013.01); *H04L 69/16* (2013.01); *H04L 69/22* (2013.01); *H04W 72/08* (2013.01); *H04W 84/18* (2013.01); *G06F 2009/4557* (2013.01); *G06F 2009/45587* (2013.01); *G06F 2009/45591* (2013.01); *G06F 2009/45595* (2013.01); *G06F 2221/033* (2013.01); *G06F 2221/2101* (2013.01); *G06F 2221/2105* (2013.01); *G06F 2221/2111* (2013.01); *G06F 2221/2115* (2013.01); *G06F 2221/2145* (2013.01); *H04L 67/22* (2013.01)

(58) Field of Classification Search
USPC .................................. 370/235; 709/200, 224
See application file for complete search history.

(56) References Cited

U.S. PATENT DOCUMENTS

| | | |
|---|---|---|
| 5,400,246 A | 3/1995 | Wilson et al. |
| 5,436,909 A | 7/1995 | Dev et al. |
| 5,555,416 A | 9/1996 | Owens et al. |
| 5,726,644 A | 3/1998 | Jednacz et al. |
| 5,742,829 A | 4/1998 | Davis et al. |
| 5,831,848 A | 11/1998 | Rielly et al. |
| 5,903,545 A | 5/1999 | Sabourin et al. |
| 6,012,096 A | 1/2000 | Link et al. |
| 6,141,595 A | 10/2000 | Gloudeman et al. |

(56) References Cited

U.S. PATENT DOCUMENTS

| | | |
|---|---|---|
| 6,144,962 A | 11/2000 | Weinberg et al. |
| 6,239,699 B1 | 5/2001 | Ronnen |
| 6,247,058 B1 | 6/2001 | Miller et al. |
| 6,249,241 B1 | 6/2001 | Jordan et al. |
| 6,330,562 B1 | 12/2001 | Boden et al. |
| 6,353,775 B1 | 3/2002 | Nichols |
| 6,525,658 B2 | 2/2003 | Streetman et al. |
| 6,597,663 B1 | 7/2003 | Rekhter |
| 6,611,896 B1 | 8/2003 | Mason, Jr. et al. |
| 6,654,750 B1 | 11/2003 | Adams et al. |
| 6,728,779 B1 | 4/2004 | Griffin et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,096,368 B2 | 8/2006 | Kouznetsov et al. |
| 7,111,055 B2 | 9/2006 | Falkner |
| 7,120,934 B2 | 10/2006 | Ishikawa |
| 7,162,643 B1 | 1/2007 | Sankaran et al. |
| 7,167,483 B1 * | 1/2007 | Sharma .................. H04J 3/14 370/442 |
| 7,181,769 B1 | 2/2007 | Keanini et al. |
| 7,185,103 B1 | 2/2007 | Jain |
| 7,203,740 B1 | 4/2007 | Putzolu et al. |
| 7,302,487 B2 | 11/2007 | Ylonen et al. |
| 7,337,206 B1 * | 2/2008 | Wen ..................... H04L 43/00 370/235 |
| 7,349,761 B1 | 3/2008 | Cruse |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,743,242 B2 | 6/2010 | Oberhaus et al. |
| 7,752,307 B2 | 7/2010 | Takara |
| 7,774,498 B1 | 8/2010 | Kraemer et al. |
| 7,783,457 B2 | 8/2010 | Cunningham |
| 7,787,480 B1 | 8/2010 | Mehta et al. |
| 7,788,477 B1 | 8/2010 | Huang et al. |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,056,134 B1 | 11/2011 | Ogilvie |
| 8,115,617 B2 | 2/2012 | Thubert et al. |
| 8,135,657 B2 | 3/2012 | Kapoor et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,181,248 B2 | 5/2012 | Oh et al. |
| 8,185,824 B1 | 5/2012 | Mitchell et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,356,007 B2 * | 1/2013 | Larson ................... G06F 16/27 707/610 |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,588,081 B2 | 11/2013 | Salam et al. |
| 8,600,726 B1 | 12/2013 | Varshney et al. |
| 8,613,084 B2 | 12/2013 | Dalcher |
| 8,615,803 B2 | 12/2013 | Dacier et al. |
| 8,630,316 B2 | 1/2014 | Haba |
| 8,631,464 B2 | 1/2014 | Belakhdar et al. |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,931,043 B2 | 1/2015 | Cooper et al. |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |

(56) References Cited

U.S. PATENT DOCUMENTS

| | | | |
|---|---|---|---|
| 8,997,227 B1 | 3/2015 | Mhatre et al. | |
| 9,014,047 B2 | 4/2015 | Alcala et al. | |
| 9,015,716 B2 | 4/2015 | Fletcher et al. | |
| 9,071,575 B2 | 6/2015 | Lemaster et al. | |
| 9,088,598 B1 | 7/2015 | Zhang et al. | |
| 9,104,543 B1* | 8/2015 | Cavanagh | H04L 41/0677 |
| 9,110,905 B2 | 8/2015 | Polley et al. | |
| 9,117,075 B1 | 8/2015 | Yeh | |
| 9,130,836 B2 | 9/2015 | Kapadia et al. | |
| 9,152,789 B2 | 10/2015 | Natarajan et al. | |
| 9,160,764 B2 | 10/2015 | Stiansen et al. | |
| 9,178,906 B1 | 11/2015 | Chen et al. | |
| 9,185,127 B2 | 11/2015 | Neou et al. | |
| 9,191,402 B2 | 11/2015 | Yan | |
| 9,197,654 B2 | 11/2015 | Ben-Shalom et al. | |
| 9,225,793 B2 | 12/2015 | Dutta et al. | |
| 9,237,111 B2 | 1/2016 | Banavalikar et al. | |
| 9,246,702 B1 | 1/2016 | Sharma et al. | |
| 9,246,773 B2 | 1/2016 | Degioanni | |
| 9,252,915 B1* | 2/2016 | Bakken | H02J 13/00 |
| 9,253,042 B2 | 2/2016 | Lumezanu et al. | |
| 9,258,217 B2 | 2/2016 | Duffield et al. | |
| 9,281,940 B2 | 3/2016 | Matsuda et al. | |
| 9,286,047 B1 | 3/2016 | Avramov et al. | |
| 9,294,486 B1 | 3/2016 | Chiang et al. | |
| 9,317,574 B1 | 4/2016 | Brisebois et al. | |
| 9,319,384 B2 | 4/2016 | Yan et al. | |
| 9,369,435 B2 | 6/2016 | Short et al. | |
| 9,369,479 B2 | 6/2016 | Lin | |
| 9,378,068 B2 | 6/2016 | Anantharam et al. | |
| 9,385,917 B1* | 7/2016 | Khanna | H04L 41/0645 |
| 9,396,327 B2 | 7/2016 | Auger et al. | |
| 9,405,903 B1 | 8/2016 | Xie et al. | |
| 9,417,985 B2 | 8/2016 | Baars et al. | |
| 9,418,222 B1 | 8/2016 | Rivera et al. | |
| 9,426,068 B2 | 8/2016 | Dunbar et al. | |
| 9,454,324 B1 | 9/2016 | Madhavapeddi | |
| 9,462,013 B1 | 10/2016 | Boss et al. | |
| 9,465,696 B2 | 10/2016 | McNeil et al. | |
| 9,501,744 B1 | 11/2016 | Brisebois et al. | |
| 9,531,589 B2 | 12/2016 | Clemm et al. | |
| 9,563,517 B1 | 2/2017 | Natanzon et al. | |
| 9,634,915 B2 | 4/2017 | Bley | |
| 9,645,892 B1 | 5/2017 | Patwardhan | |
| 9,684,453 B2 | 6/2017 | Holt et al. | |
| 9,697,033 B2 | 7/2017 | Koponen et al. | |
| 9,729,568 B2* | 8/2017 | Lefebvre | H04L 43/0894 |
| 9,733,973 B2 | 8/2017 | Prasad et al. | |
| 9,749,145 B2 | 8/2017 | Banavalikar et al. | |
| 9,800,608 B2 | 10/2017 | Korsunsky et al. | |
| 9,857,825 B1* | 1/2018 | Johnson | G05F 5/00 |
| 9,904,584 B2* | 2/2018 | Konig | G06F 11/079 |
| 10,116,531 B2 | 10/2018 | Alizadeh Attar et al. | |
| 10,171,319 B2 | 1/2019 | Yadav et al. | |
| 10,454,793 B2 | 10/2019 | Deen et al. | |
| 2001/0028646 A1 | 10/2001 | Arts et al. | |
| 2002/0053033 A1 | 5/2002 | Cooper et al. | |
| 2002/0097687 A1 | 7/2002 | Meiri et al. | |
| 2002/0103793 A1 | 8/2002 | Koller et al. | |
| 2002/0107857 A1 | 8/2002 | Teraslinna | |
| 2002/0141343 A1 | 10/2002 | Bays | |
| 2002/0184393 A1 | 12/2002 | Leddy et al. | |
| 2003/0023601 A1 | 1/2003 | Fortier, Jr. et al. | |
| 2003/0065986 A1 | 4/2003 | Fraenkel et al. | |
| 2003/0097439 A1 | 5/2003 | Strayer et al. | |
| 2003/0126242 A1 | 7/2003 | Chang | |
| 2003/0145232 A1 | 7/2003 | Poletto et al. | |
| 2003/0151513 A1 | 8/2003 | Herrmann et al. | |
| 2003/0154399 A1 | 8/2003 | Zuk et al. | |
| 2003/0177208 A1 | 9/2003 | Harvey, IV | |
| 2004/0019676 A1 | 1/2004 | Iwatsuki et al. | |
| 2004/0030776 A1 | 2/2004 | Cantrell et al. | |
| 2004/0036478 A1* | 2/2004 | Logvinov | H04B 3/54 |
| | | | 324/534 |
| 2004/0205536 A1 | 10/2004 | Newman et al. | |
| 2004/0213221 A1 | 10/2004 | Civanlar et al. | |
| 2004/0243533 A1 | 12/2004 | Dempster et al. | |
| 2004/0255050 A1 | 12/2004 | Takehiro et al. | |
| 2004/0268149 A1 | 12/2004 | Aaron | |
| 2005/0028154 A1 | 2/2005 | Smith et al. | |
| 2005/0039104 A1 | 2/2005 | Shah et al. | |
| 2005/0060403 A1* | 3/2005 | Bernstein | H04L 29/06 |
| | | | 709/224 |
| 2005/0063377 A1 | 3/2005 | Bryant et al. | |
| 2005/0083933 A1 | 4/2005 | Fine et al. | |
| 2005/0108331 A1 | 5/2005 | Osterman | |
| 2005/0166066 A1 | 7/2005 | Ahuja et al. | |
| 2005/0177829 A1 | 8/2005 | Vishwanath | |
| 2005/0185621 A1 | 8/2005 | Sivakumar et al. | |
| 2005/0198247 A1 | 9/2005 | Perry et al. | |
| 2005/0198371 A1 | 9/2005 | Smith et al. | |
| 2005/0198629 A1 | 9/2005 | Vishwanath | |
| 2005/0207376 A1 | 9/2005 | Ashwood-Smith et al. | |
| 2005/0257244 A1 | 11/2005 | Joly et al. | |
| 2005/0289244 A1 | 12/2005 | Sahu et al. | |
| 2006/0048218 A1 | 3/2006 | Lingafelt et al. | |
| 2006/0077909 A1 | 4/2006 | Saleh et al. | |
| 2006/0080733 A1 | 4/2006 | Khosmood et al. | |
| 2006/0095968 A1 | 5/2006 | Portolani et al. | |
| 2006/0143432 A1 | 6/2006 | Rothman et al. | |
| 2006/0156408 A1 | 7/2006 | Himberger et al. | |
| 2006/0159032 A1 | 7/2006 | Ukrainetz et al. | |
| 2006/0173912 A1 | 8/2006 | Lindvall et al. | |
| 2006/0195448 A1 | 8/2006 | Newport | |
| 2006/0212556 A1 | 9/2006 | Yacoby et al. | |
| 2006/0224398 A1* | 10/2006 | Lakshman | G06Q 10/0833 |
| | | | 705/333 |
| 2006/0272018 A1 | 11/2006 | Fouant | |
| 2006/0274659 A1 | 12/2006 | Ouderkirk | |
| 2006/0280179 A1 | 12/2006 | Meier | |
| 2006/0294219 A1 | 12/2006 | Ogawa et al. | |
| 2007/0010898 A1* | 1/2007 | Hosek | G05B 19/4185 |
| | | | 700/2 |
| 2007/0025306 A1 | 2/2007 | Cox et al. | |
| 2007/0044147 A1 | 2/2007 | Choi et al. | |
| 2007/0097976 A1 | 5/2007 | Wood et al. | |
| 2007/0118654 A1 | 5/2007 | Jamkhedkar et al. | |
| 2007/0127491 A1 | 6/2007 | Verzijp et al. | |
| 2007/0162420 A1 | 7/2007 | Ou et al. | |
| 2007/0169179 A1 | 7/2007 | Narad | |
| 2007/0180526 A1 | 8/2007 | Copeland, III | |
| 2007/0195729 A1 | 8/2007 | Li et al. | |
| 2007/0195794 A1 | 8/2007 | Fujita et al. | |
| 2007/0195797 A1 | 8/2007 | Patel et al. | |
| 2007/0201474 A1 | 8/2007 | Isobe | |
| 2007/0211637 A1 | 9/2007 | Mitchell | |
| 2007/0214348 A1 | 9/2007 | Danielsen | |
| 2007/0230415 A1 | 10/2007 | Malik | |
| 2007/0250930 A1 | 10/2007 | Aziz et al. | |
| 2007/0280108 A1* | 12/2007 | Sakurai | H04L 43/087 |
| | | | 370/232 |
| 2007/0300061 A1 | 12/2007 | Kim et al. | |
| 2008/0022385 A1 | 1/2008 | Crowell et al. | |
| 2008/0046708 A1 | 2/2008 | Fitzgerald et al. | |
| 2008/0056124 A1 | 3/2008 | Nanda et al. | |
| 2008/0082662 A1 | 4/2008 | Danliker et al. | |
| 2008/0101234 A1 | 5/2008 | Nakil et al. | |
| 2008/0120350 A1 | 5/2008 | Grabowski et al. | |
| 2008/0126534 A1 | 5/2008 | Mueller et al. | |
| 2008/0155245 A1 | 6/2008 | Lipscombe et al. | |
| 2008/0181100 A1* | 7/2008 | Yang | H04L 41/0654 |
| | | | 370/216 |
| 2008/0201109 A1 | 8/2008 | Zill et al. | |
| 2008/0250122 A1 | 10/2008 | Zsigmond et al. | |
| 2008/0250128 A1* | 10/2008 | Sargent | H04L 41/22 |
| | | | 709/223 |
| 2008/0262990 A1* | 10/2008 | Kapoor | H04L 63/1408 |
| | | | 706/20 |
| 2008/0270199 A1 | 10/2008 | Chess et al. | |
| 2008/0295163 A1 | 11/2008 | Kang | |
| 2008/0301765 A1 | 12/2008 | Nicol et al. | |
| 2009/0059934 A1 | 3/2009 | Aggarwal et al. | |
| 2009/0064332 A1 | 3/2009 | Porras et al. | |
| 2009/0106646 A1 | 4/2009 | Mollicone et al. | |

(56) References Cited

U.S. PATENT DOCUMENTS

| | | |
|---|---|---|
| 2009/0133126 A1 | 5/2009 | Jang et al. |
| 2009/0180393 A1* | 7/2009 | Nakamura ............... H04L 41/12 370/252 |
| 2009/0241170 A1 | 9/2009 | Kumar et al. |
| 2009/0252181 A1* | 10/2009 | Desanti ................. H04L 12/413 370/474 |
| 2009/0300180 A1 | 12/2009 | Dehaan et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0049839 A1 | 2/2010 | Parker et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0180016 A1 | 7/2010 | Bugwadia et al. |
| 2010/0220584 A1 | 9/2010 | DeHaan et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0246432 A1* | 9/2010 | Zhang .................... H04L 43/16 370/252 |
| 2010/0287266 A1 | 11/2010 | Asati et al. |
| 2010/0303240 A1 | 12/2010 | Beachem |
| 2010/0319060 A1 | 12/2010 | Aiken et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0083125 A1 | 4/2011 | Komatsu et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153811 A1 | 6/2011 | Jeong et al. |
| 2011/0158088 A1 | 6/2011 | Lofstrand et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0246663 A1 | 10/2011 | Melsen et al. |
| 2011/0267952 A1* | 11/2011 | Ko .......................... H04L 45/70 370/237 |
| 2011/0277034 A1 | 11/2011 | Hanson |
| 2011/0302652 A1 | 12/2011 | Westerfeld |
| 2011/0314148 A1 | 12/2011 | Petersen et al. |
| 2012/0005542 A1 | 1/2012 | Petersen et al. |
| 2012/0075999 A1* | 3/2012 | Ko ....................... H04L 43/0858 370/238 |
| 2012/0079592 A1 | 3/2012 | Pandrangi |
| 2012/0089664 A1* | 4/2012 | Igelka .................... G06F 9/5083 709/203 |
| 2012/0102361 A1 | 4/2012 | Sass et al. |
| 2012/0102543 A1 | 4/2012 | Kohli et al. |
| 2012/0102545 A1 | 4/2012 | Carter, III et al. |
| 2012/0117226 A1 | 5/2012 | Tanaka et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240185 A1 | 9/2012 | Kapoor et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1 | 11/2012 | Lin et al. |
| 2012/0281700 A1 | 11/2012 | Koganti et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |
| 2013/0080375 A1* | 3/2013 | Viswanathan ........ G06F 11/076 706/52 |
| 2013/0086272 A1 | 4/2013 | Chen et al. |
| 2013/0103827 A1 | 4/2013 | Dunlap et al. |
| 2013/0107709 A1 | 5/2013 | Campbell et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198839 A1 | 8/2013 | Wei et al. |
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0232498 A1 | 9/2013 | Mangtani et al. |
| 2013/0238665 A1 | 9/2013 | Sequin |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0308468 A1* | 11/2013 | Cowie .................... G06F 30/20 370/248 |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0336164 A1 | 12/2013 | Yang et al. |
| 2013/0343207 A1* | 12/2013 | Cook .................. H04L 43/0852 370/252 |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0033193 A1 | 1/2014 | Palaniappan |
| 2014/0040343 A1 | 2/2014 | Nickolov et al. |
| 2014/0047185 A1 | 2/2014 | Peterson et al. |
| 2014/0047274 A1* | 2/2014 | Lumezanu .......... G06F 11/3476 714/37 |
| 2014/0047372 A1 | 2/2014 | Gnezdov et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |

(56) References Cited

U.S. PATENT DOCUMENTS

| | | |
|---|---|---|
| 2014/0115219 A1 | 4/2014 | Ajanovic et al. |
| 2014/0137109 A1 | 5/2014 | Sharma et al. |
| 2014/0140213 A1 | 5/2014 | Raleigh et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0230062 A1* | 8/2014 | Kumaran ............ H04L 63/1408 726/24 |
| 2014/0280499 A1 | 9/2014 | Basavaiah et al. |
| 2014/0280908 A1 | 9/2014 | Rothstein et al. |
| 2014/0281030 A1 | 9/2014 | Cui et al. |
| 2014/0286174 A1 | 9/2014 | Iizuka et al. |
| 2014/0286354 A1 | 9/2014 | Van De Poel et al. |
| 2014/0289418 A1* | 9/2014 | Cohen ................ G06F 11/3688 709/226 |
| 2014/0289854 A1 | 9/2014 | Mahvi |
| 2014/0298461 A1 | 10/2014 | Hohndel et al. |
| 2014/0317278 A1 | 10/2014 | Kersch et al. |
| 2014/0317737 A1 | 10/2014 | Shin et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0344438 A1* | 11/2014 | Chen ................ H04L 12/6418 709/223 |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006714 A1 | 1/2015 | Jain |
| 2015/0009840 A1 | 1/2015 | Pruthi et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0058976 A1 | 2/2015 | Carney et al. |
| 2015/0067143 A1 | 3/2015 | Babakhan et al. |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0128133 A1 | 5/2015 | Pohlmann |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0199254 A1* | 7/2015 | Vesepogu ............ G06F 11/3466 717/130 |
| 2015/0222516 A1* | 8/2015 | Deval ................ H04L 67/1029 370/253 |
| 2015/0222939 A1 | 8/2015 | Gallant et al. |
| 2015/0249622 A1 | 9/2015 | Phillips et al. |
| 2015/0256413 A1* | 9/2015 | Du ........................ H04L 41/12 370/216 |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271008 A1 | 9/2015 | Jain et al. |
| 2015/0271255 A1 | 9/2015 | Mackay et al. |
| 2015/0295945 A1 | 10/2015 | Canzanese, Jr. et al. |
| 2015/0304346 A1* | 10/2015 | Kim ........................ H04L 43/04 726/23 |
| 2015/0356297 A1 | 10/2015 | Yang et al. |
| 2015/0341379 A1* | 11/2015 | Lefebvre ............ H04W 12/08 726/22 |
| 2015/0341383 A1* | 11/2015 | Reddy ................ H04L 63/1466 726/22 |
| 2015/0347554 A1 | 12/2015 | Vasantham et al. |
| 2015/0358352 A1 | 12/2015 | Chasin et al. |
| 2016/0006753 A1 | 1/2016 | McDaid et al. |
| 2016/0019030 A1 | 1/2016 | Shukla et al. |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036833 A1 | 2/2016 | Ardeli et al. |
| 2016/0036837 A1 | 2/2016 | Jain et al. |
| 2016/0036838 A1* | 2/2016 | Jain ..................... H04L 63/1416 726/23 |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1* | 5/2016 | Konig ..................... G06F 16/20 714/37 |
| 2016/0148251 A1 | 5/2016 | Thomas et al. |
| 2016/0150060 A1* | 5/2016 | Meng ..................... H04L 67/10 709/223 |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0234083 A1 | 8/2016 | Ahn et al. |
| 2016/0269442 A1 | 9/2016 | Shieh |
| 2016/0269482 A1* | 9/2016 | Jamjoom ............ H04L 67/1095 |
| 2016/0283307 A1* | 9/2016 | Takeshima .......... G06F 11/0709 |
| 2016/0294691 A1 | 10/2016 | Joshi |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |

(56) References Cited

U.S. PATENT DOCUMENTS

| | | | |
|---|---|---|---|
| 2016/0359879 | A1 | 12/2016 | Deen et al. |
| 2016/0359880 | A1 | 12/2016 | Pang et al. |
| 2016/0359881 | A1 | 12/2016 | Yadav et al. |
| 2016/0359888 | A1 | 12/2016 | Gupta et al. |
| 2016/0359889 | A1 | 12/2016 | Yadav et al. |
| 2016/0359890 | A1 | 12/2016 | Deen et al. |
| 2016/0359891 | A1 | 12/2016 | Pang et al. |
| 2016/0359897 | A1 | 12/2016 | Yadav et al. |
| 2016/0359905 | A1 | 12/2016 | Touboul et al. |
| 2016/0359912 | A1 | 12/2016 | Gupta et al. |
| 2016/0359913 | A1 | 12/2016 | Gupta et al. |
| 2016/0359914 | A1 | 12/2016 | Deen et al. |
| 2016/0359915 | A1 | 12/2016 | Gupta et al. |
| 2016/0359917 | A1 | 12/2016 | Rao et al. |
| 2016/0373481 | A1 | 12/2016 | Sultan et al. |
| 2017/0024453 | A1 | 1/2017 | Raja et al. |
| 2017/0034018 | A1 | 2/2017 | Parasdehgheibi et al. |
| 2017/0048121 | A1 | 2/2017 | Hobbs et al. |
| 2017/0070582 | A1 | 3/2017 | Desai et al. |
| 2017/0085483 | A1 | 3/2017 | Mihaly et al. |
| 2017/0201448 | A1* | 7/2017 | Deval ............... H04L 67/1029 |
| 2017/0208487 | A1 | 7/2017 | Ratakonda et al. |
| 2017/0250880 | A1 | 8/2017 | Akens et al. |
| 2017/0250951 | A1 | 8/2017 | Wang et al. |
| 2017/0289067 | A1 | 10/2017 | Lu et al. |
| 2017/0295141 | A1 | 10/2017 | Thubert et al. |
| 2017/0302691 | A1 | 10/2017 | Singh et al. |
| 2017/0324518 | A1 | 11/2017 | Meng et al. |
| 2017/0331747 | A1 | 11/2017 | Singh et al. |
| 2017/0346736 | A1 | 11/2017 | Chander et al. |
| 2017/0364380 | A1 | 12/2017 | Frye, Jr. et al. |
| 2018/0006911 | A1 | 1/2018 | Dickey |
| 2018/0007115 | A1 | 1/2018 | Nedeltchev et al. |
| 2018/0013670 | A1 | 1/2018 | Kapadia et al. |
| 2018/0145906 | A1 | 5/2018 | Yadav et al. |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |

OTHER PUBLICATIONS

Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.

Author Unknown, "Blacklists & Dynamic Reputation: Understanding Why the Evolving Threat Eludes Blacklists," www.dambala.com, 9 pages, Dambala, Atlanta, GA, USA.

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

Bayati, Mohsen, et al., "Message-Passing Algorithms for Sparse Network Alignment," Mar. 2013, 31 pages.

Berezinski, Przemyslaw, et al., "An Entropy-Based Network Anomaly Detection Method," Entropy, 2015, vol. 17, www.mdpi.com/journal/entropy, pp. 2367-2408.

Berthier, Robin, et al. "Nfsight: Netflow-based Network Awareness Tool," 2010, 16 pages.

Bhuyan, Dhiraj, "Fighting Bots and Botnets," 2006, pp. 23-28.

Blair, Dana, et al., U.S. Appl. No. 62/106,006, filed Jan. 21, 2015, entitled "Monitoring Network Policy Compliance."

Chandran, Midhun, et al., "Monitoring in a Virtualized Environment," GSTF International Journal on Computing, vol. 1, No. 1, Aug. 2010.

Chari, Suresh, et al., "Ensuring continuous compliance through reconciling policy with usage," Proceedings of the $18^{th}$ ACM symposium on Access control models and technologies (SACMAT '13). ACM, New York, NY, USA, 49-60.

Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.

Cisco Systems, "Cisco Network Analysis Modules (NAM) Tutorial," Cisco Systems, Inc., Version 3.5.

Cisco Systems, Inc., "Addressing Compliance from One Infrastructure: Cisco Unified Compliance Solution Framework," 2014.

Cisco Systems, Inc., "Cisco Application Dependency Mapping Service," 2009.

Cisco Systems, Inc., "White Paper—New Cisco Technologies Help Customers Achieve Regulatory Compliance," 1992-2008.

Cisco Systems, Inc., "A Cisco Guide to Defending Against Distributed Denial of Service Attacks," May 3, 2016, 34 pages.

Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.

Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.

Feinstein, Laura, et al., "Statistical Approaches to DDoS Attack Detection and Response," Proceedings of the DARPA Information Survivability Conference and Exposition (DISCEX '03), Apr. 2003, 12 pages.

George, Ashley, et al., "NetPal: A Dynamic Network Administration Knowledge Base," 2008, pp. 1-14.

Goldsteen, Abigail, et al., "A Tool for Monitoring and Maintaining System Trustworthiness at Run Time," REFSQ (2015), pp. 142-147.

Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.

Hewlett-Packard, "Effective use of reputation intelligence in a security operations center," Jul. 2013, 6 pages.

Hideshima, Yusuke, et al., "StarMine: A Visualization System for Cyber Attacks," https://www.researchgate.net/publication/221536306, Feb. 2006, 9 pages.

InternetPerils, Inc., "Control Your Internet Business Risk," 2003-2015, https://www.internetperils.com.

Janoff, Christian, et al., "Cisco Compliance Solution for HIPAA Security Rule Design and Implementation Guide," Cisco Systems, Inc., Updated Nov. 14, 2015, part 1 of 2, 350 pages.

Janoff, Christian, et al., "Cisco Compliance Solution for HIPAA Security Rule Design and Implementation Guide," Cisco Systems, Inc., Updated Nov. 14, 2015, part 2 of 2, 588 pages.

Kerrison, Adam, et al., "Four Steps to Faster, Better Application Dependency Mapping—Laying the Foundation for Effective Business Service Models," BMCSoftware, 2011.

(56) References Cited

OTHER PUBLICATIONS

Kraemer, Brian, "Get to know your data center with CMDB," TechTarget, Apr. 5, 2006, http://searchdatacenter.techtarget.com/news/118820/Get-to-know-your-data-center-with-CMDB.
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," in Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers Infocom, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," https://web.archive.org/web/20150908090456/http://neverfailgroup.com/products/it-continuity-architect.
Nilsson, Dennis K., et al., "Key Management and Secure Software Updates in Wireless Process Control Environments," in Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. Sep. 13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwasystems.com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Woodberg, Brad, "Snippet from Juniper SRX Series" Jun. 17, 2013, 1 page, O'Reilly Media, Inc.
Zhang, Yue, et al., "Cantina: A Content-Based Approach to Detecting Phishing Web Sites," May 8-12, 2007, pp. 639-648.
Bosch, Greg, "Virtualization," 2010, 33 pages.
Breen, Christopher, "MAC 911, How to dismiss Mac App Store Notifications," Macworld.com, Mar. 24, 2014, 3 pages.
Chou, C.W., et al., "Optical Clocks and Relativity," Science vol. 329, Sep. 24, 2010, pp. 1630-1633.
Huang, Hing-Jie, et al., "Clock Skew Based Node Identification in Wireless Sensor Networks," IEEE, 2008, 5 pages.
Ives, Herbert, E., et al., "An Experimental Study of the Rate of a Moving Atomic Clock," Journal of the Optical Society of America, vol. 28, No. 7, Jul. 1938, pp. 215-226.
Witze, Alexandra, "Special relativity aces time trial, 'Time dilation' predicted by Einstein confirmed by lithium ion experiment," Nature, Sep. 19, 2014, 3 pages.
Zatrochova, Zuzana, "Analysis and Testing of Distributed NoSQL Datastore Riak," Spring, 2015, 76 pages.
Arista Networks, Inc., "Application Visibility and Network Telemtry using Splunk," Arista White Paper, Nov. 2013, 11 pages.
Bauch, Petr, "Reader's Report of Master's Thesis, Analysis and Testing of Distributed NoSQL Datastore Riak," May 28, 2015, Brno. 2 pages.
Cisco Systems, Inc., "Cisco Application Visibility and Control," Oct. 2011, 2 pages.
Cisco Systems, Inc., "Cisco Tetration Platform Data Sheet", Updated Mar. 5, 2018, 21 pages.
Duan, Yiheng, et al., Detective: Automatically Identify and Analyze Malware Processes in Forensic Scenarios via DLLs, IEEE ICC 2015—Next Generation Networking Symposium, pp. 5691-5696.
Heckman, Sarah, et al., "On Establishing a Benchmark for Evaluating Static Analysis Alert Prioritization and Classification Techniques," IEEE, 2008; 10 pages.
Kim, Myung-Sup, et al. "A Flow-based Method for Abnormal Network Traffic Detection, " IEEE, 2004, pp. 599-612.
Thomas, R., "Bogon Dotted Decimal List," Version 7.0, Team Cymru NOC, Apr. 27, 2012, 5 pages.
Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.
Brocade Communications Systems, Inc., "Chapter 5—Configuring Virtual LANs (VLANs)," Jun. 2009, 38 pages.
Cisco Systems, Inc. "Cisco, Nexus 3000 Series NX-OS Release Notes, Release 5.0(3)U3(1)," Feb. 29, 2012, Part No. OL-26631-01, 16 pages.
Cisco Systems, Inc., "Cisco—VPN Client User Guide for Windows," Release 4.6, Aug. 2004, 148 pages.
Cisco Systems, Inc., "Cisco 4710 Application Control Engine Appliance Hardware Installation Guide," Nov. 2007, 66 pages.
Cisco Systems, Inc., "Cisco Data Center Network Architecture and Solutions Overview," Feb. 2006, 19 pages.
Cisco Systems, Inc., "Cisco IOS Configuration Fundamentals Configuration Guide: *Using Autoinstall and Setup*," Release 12.2, first published Apr. 2001, last updated Sep. 2003, 32 pages.
Cisco Systems, Inc., "Cisco VN-Link: Virtualization-Aware Networking," White Paper, Mar. 2009, 10 pages.
Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.
Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.

(56) References Cited

OTHER PUBLICATIONS

Cisco Systems, Inc., "Quick Start Guide, Cisco ACE 4700 Series Application Control Engine Appliance," Software Ve740rsion A5(1.0), Sep. 2011, 138 pages.
Cisco Systems, Inc., "Routing and Bridging Guide, Cisco ACE Application Control Engine," Software Version A5(1.0), Sep. 2011, 248 pages.
Cisco Systems, Inc., "VMWare and Cisco Virtualization Solution: Scale Virtual Machine Networking," Jul. 2009, 4 pages.
Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.
Cisco Technology, Inc., "Cisco IOS Software Release 12.4T Features and Hardware Support," Feb. 2009, 174 pages.
Cisco Systems, Inc., "Cisco Application Control Engine (ACE) Troubleshooting Guide—Understanding the ACE Module Architecture and Traffic Flow," Mar. 11, 2011, 6 pages.
Costa, Raul, et al., "An Intelligent Alarm Management System for Large-Scale Telecommunication Companies," in Portuguese Conference on Artificial Intelligence, Oct. 2009, 14 pages.
De Carvalho, Tiago Filipe Rodrigues, "Root Cause Analysis in Large and Complex Networks," Dec. 2008, Repositorio.ul.pt, pp. 1-55.
Foundation for Intelligent Physical Agents, "FIPA Agent Message Transport Service Specification," Dec. 3, 2002, http://www.fipa.org; 15 pages.
Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.
Joseph, Dilip, et al., "Modeling Middleboxes," IEEE Network, Sep./Oct. 2008, pp. 20-25.
Kent, S., et al. "Security Architecture for the Internet Protocol," Network Working Group, Nov. 1998, 67 pages.
Online Collins English Dictionary, 1 page (Year: 2018).
Voris, Jonathan, et al., "Bait and Snitch: Defending Computer Systems with Decoys," Columbia University Libraries, Department of Computer Science, 2013, pp. 1-25.

\* cited by examiner

US 10,979,322 B2

TECHNIQUES FOR DETERMINING NETWORK ANOMALIES IN DATA CENTER NETWORKS

CROSS-REFERENCE TO RELATED APPLICATIONS

The present application claims priority to U.S. Provisional Patent Application Ser. No. 62/171,899, filed on Jun. 5, 2015, the content of which is herein incorporated by reference.

TECHNICAL FIELD

The present subject matter relates generally to communication networks, and more particularly, to detecting network anomalies or faults for data center networks.

BACKGROUND

Increasingly, consumers and businesses alike turn to cloud-based services over local computing environments. Such cloud-based computing services advantageously provide access to customizable and scalable computing resources over a network (e.g., the Internet). Typically, cloud-based service providers house such computing resources in one or more data centers that may include hundreds or even thousands of devices such as servers, switches, processors, memory, and other corresponding hardware and software components. The sheer number of data center devices or nodes as well as the number of possible configurations often results in complex networks within each data center. Moreover, the devices forming such complex networks may dynamically change depending on customer needs. Accordingly, it is often difficult to identify node topologies, data path flow, and/or path characteristics for devices and/or networks within data center networks.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

Figure 1:
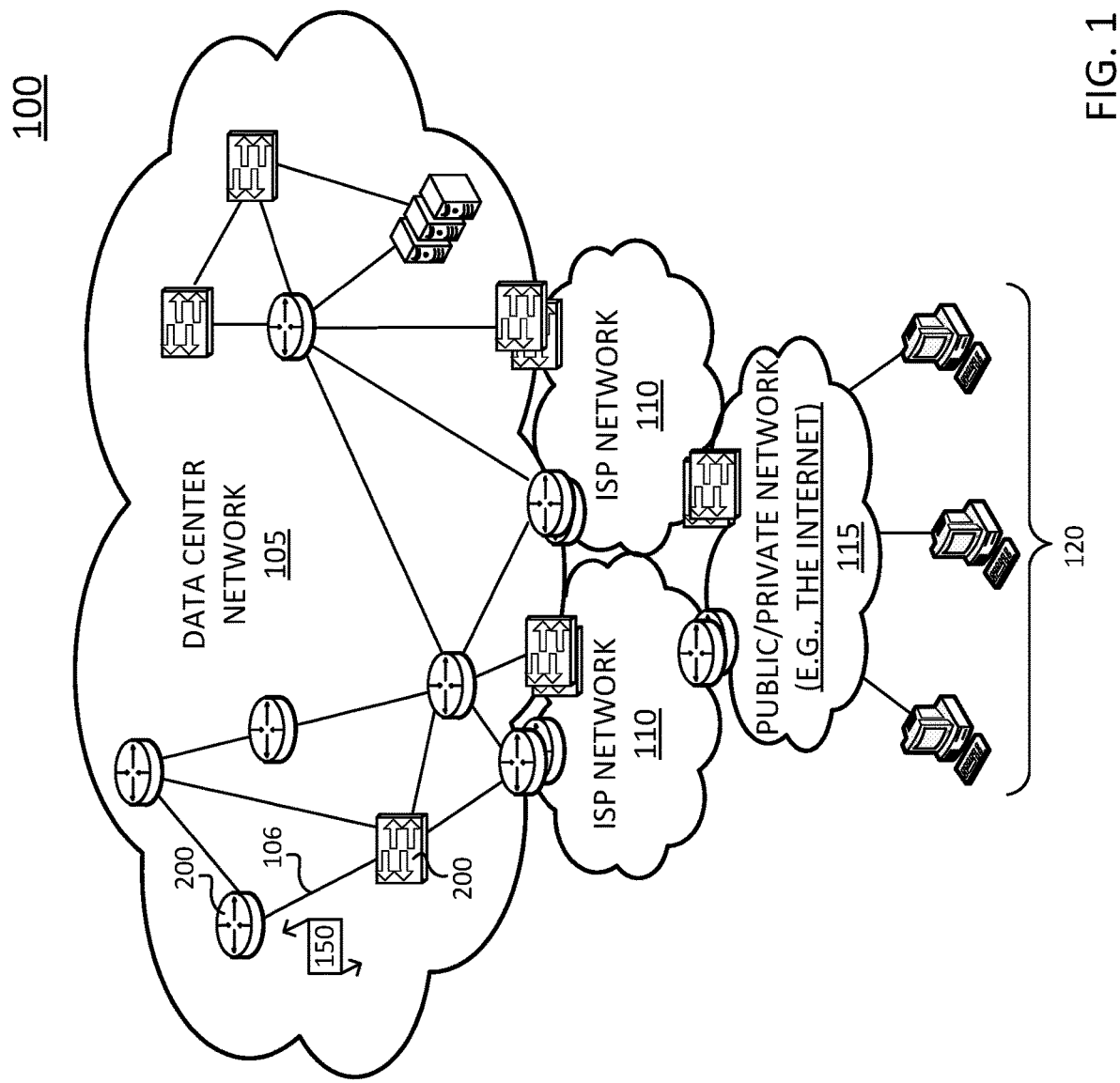
FIG. 1 illustrates a schematic diagram of an example communication network.

According to one or more embodiments of the disclosure, a monitoring device (or module) monitors a plurality of nodes in a data center network, and determines one or more latency distributions of response times for messages exchanged between pairs of nodes of the plurality of nodes. The network monitoring device further determines a network topology for the plurality of nodes consistent with the one or more latency distributions. Notably, the network topology can include one or more communication links interconnecting nodes of the plurality of nodes and a relative position for each node of the plurality of nodes. In some embodiments, the network monitoring device also determines a representative response time for each communication link of the one or more communication links based on the one or more latency distributions, and compares a current response time for at least one message exchanged between one pair of nodes to the representative response time for the communication link interconnecting the one pair of nodes. The network monitoring device also identifies a network anomaly when the current response time deviates from the representative response time for the communication link interconnecting the one pair of nodes by a threshold amount.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A communication network is a geographically distributed collection of nodes interconnected by communication links and segments for transporting data between end nodes, such as computers, workstations, servers, and the like. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology. Data centers, as mentioned above, can include complex networks of computing resources (e.g., mainframe computers, servers, application software, file and printer servers executing various operating systems, storage subsystems, network infrastructure, and the like) and provide network-based access to such computer resources.

FIG. 1 illustrates a schematic diagram of an example communication network 100 illustratively comprising a data center network 105, one or more Internet Service Provider (ISP) network(s) 110, and a public/private network 115 (e.g., the Internet). Operatively, data center network 105 hosts computing resources (e.g., applications, services, storage, network infrastructure, and the like) and provides access to such computing resources to one or more client device(s) 120 over public/private network 115 and corresponding ISP network(s) 110

As shown, the various networks include nodes/devices that route requests and facilitate access to computing resources from data center network 105. For example, the nodes/devices shown in FIG. 1 may operate to direct data packets or messages from respective source nodes to a destination node. As shown, data center network 105 illustratively includes nodes/devices 200 (e.g., routers, sensors, servers, computers, etc.) interconnected by communication links 106. Communication links 105 may be wired links or shared media (e.g., wireless links, PLC links, etc.) where certain nodes/devices 200 may be in communication with other nodes/devices based on, for example, distance, signal strength, network/node topology, current operational status, location, etc. Further, certain nodes/devices 200 may be located near an "edge" of a network.

Data packets 150 (e.g., traffic and/or messages) may be exchanged among the nodes/devices 200 in communication network 100 using predefined network communication protocols such as certain known wired protocols (e.g., Interior Gateway Protocol (IGP), Exterior Border Gateway Protocol (E-BGP), TCP/IP, etc.), wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Those skilled in the art will understand that any number of nodes, devices, communication links, and the like may be used, and that the view shown herein is for simplicity. Also, those skilled in the art will further understand that while communication network 100 (including networks 105, 110, and 115) is shown in a certain orientation, such orientation is merely an example for purposes of illustration, not limitation.

Figure 2:
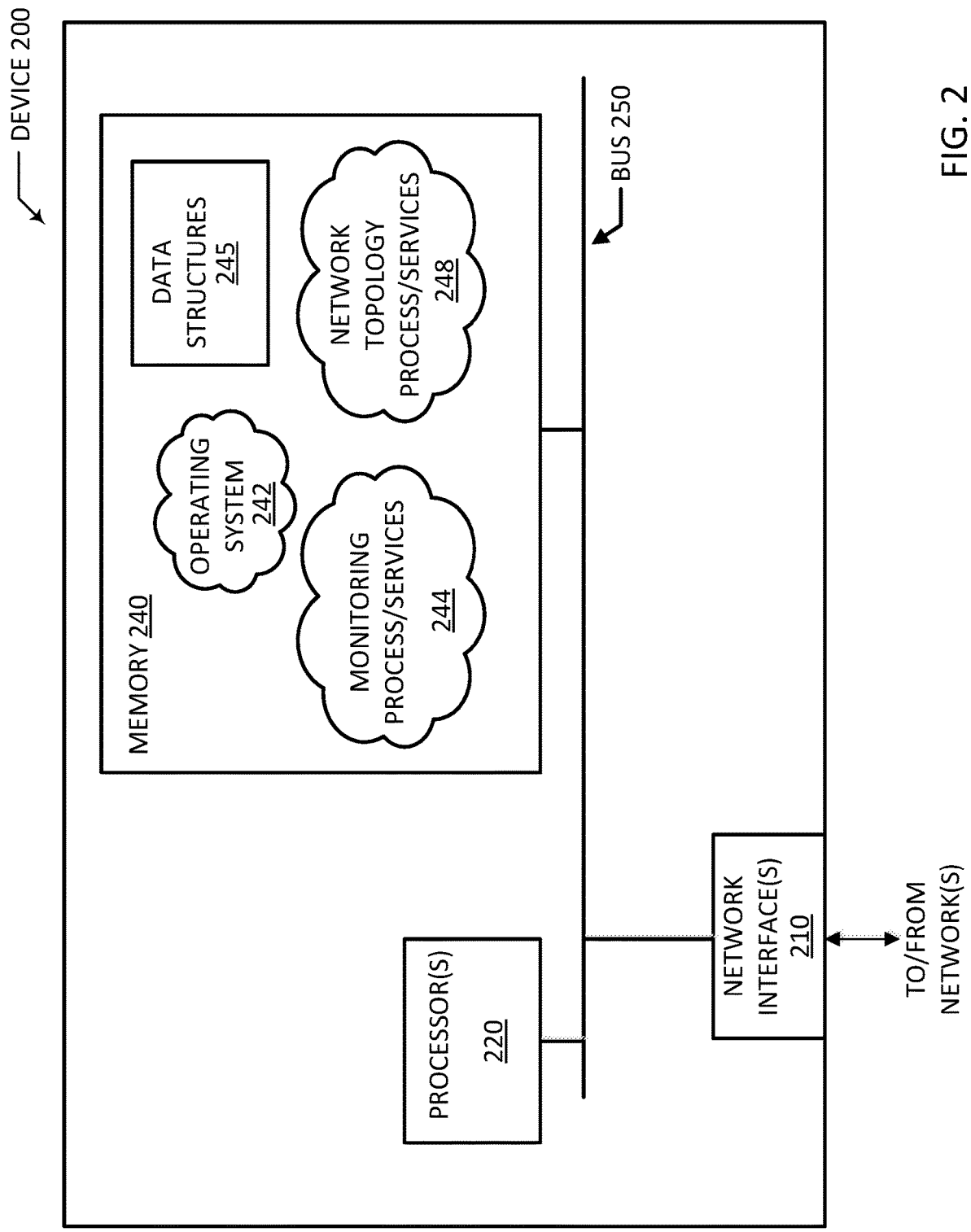
FIG. 2 illustrates a schematic diagram of an example network device/node.

FIG. 2 is a schematic diagram of one example node/device 200 that may be used with one or more embodiments described herein, e.g., as one of the nodes/devices shown in FIG. 1 above. Device 200 may comprise one or more network interfaces 210 (e.g., wired, wireless, PLC, etc.), at least one processor 220, and a memory 240 interconnected by a system bus 250.

Network interface(s) 210 contain the mechanical, electrical, and signaling circuitry for communicating data over communication links 106 coupled to communication network 100. Network interfaces 210 may be configured to transmit and/or receive data using a variety of different communication protocols. Note, further, that one or more nodes/devices may include two different types of network interfaces 210, e.g., wireless and wired/physical connections, and that the view herein is merely for illustration.

Memory 240 comprises a plurality of storage locations that are addressable by the processor 220 and network interfaces 210 for storing software programs and data structures associated with the embodiments described herein. Note that certain devices may have limited memory or no memory (e.g., no memory for storage other than for programs/processes operating on the device and associated caches). Processor 220 may comprise hardware elements or hardware logic adapted to execute the software programs and manipulate the data structures 245. An operating system 242, portions of which may resident in memory 240 and executed by processor 220, functionally organizes the device by, inter alia, invoking operations in support of software processes and/or services executing on the device. These software processes and/or services may comprise monitoring process/services 244, and an illustrative network topology process 248, as described herein. Note that while processes/services 244 and 248 are shown in centralized memory 240, alternative embodiments provide for the process to be operated within network interfaces 210 (e.g., as a component of a MAC layer, etc.).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, data centers present unique challenges for understanding node topologies, data path flow, and/or path characteristics for devices and/or networks therein. Furthermore, providing customers on-demand cloud-based services creates a dynamic and ever changing environment, including possible frequent instantiations and de-instantiations of devices. Conventional approaches for determining network topologies often use round trip response times between nodes/devices to determine relative positions in a network topology. Notably, round trip time generally refers a total amount of time for a message or a packet to travel from a first node to a second node and then back to the first node. However, such round trip time may be inaccurate and affected by various factors such as network fluctuations, packet types, and the like. Accordingly, the techniques disclosed herein improve network mapping and generate network topologies based on, for example, statistical latency distributions (e.g., response times) for messages exchanged between nodes/devices in the network.

Notably, as used herein, the term "network topology" or "node topology" generally refers to a mapping of devices or nodes in a communication network; "latency" or "latency value" generally refers to a response time for messages exchanged between nodes in a communication network; the term "packet" generally refers to messages or data exchanged between the nodes in a communication network; and the terms "paired" or "pair-wise" generally refers to a two-way exchange—e.g., one exchange representing packets sent from a first node and received by a second node, and another exchange representing packets sent from the second node and received by the first node.

According to the network monitoring and/or the network mapping techniques disclosed herein, a monitoring device (or module) such as a switch, router, edge device, or other network device, determines communication latency or paired response times between nodes in a communication network from statistical latency distributions for all messages or packets exchanged between the nodes. In some embodiments, the monitoring device determines communication latency for paired response times between nodes (e.g., from time stamp data associated with each message or packet exchanged between nodes). In certain embodiments, the monitoring device may be part of a distributed monitoring system, including a number of remote monitoring devices/nodes (e.g., located at edge switches in a network). These remote monitoring devices/nodes may be configured to time stamp messages or packets exchanged between the nodes in the network (e.g., on receipt, on transmission, etc.). Based on the time stamp data for each message, the monitoring device can determine latency distributions between pairs of nodes, and further determine representative latency values—e.g., mean latency, median latency, and the like. Outlier latency values or "bad" packet response times in a latency distribution may be eliminated or removed so as to avoid skewing the representative latency values (e.g., for initial network topology mapping). However, in some embodiments, these outlier latency values may be used to identify and troubleshoot network issues—e.g., according policies of the communication network and/or according to thresholds and/or deviations in a latency distribution. The network monitoring device further determines a network topology for the nodes in the communication network, consistent with the representative latency values, and generates a graph showing the network topology, including communication links annotated with corresponding representative latency values.

As disclosed herein, the network monitoring device or monitoring device detects, identifies, or otherwise determines a network anomaly exists in a network topology based on the representative latency values associated with communication links between nodes in the network topology. For example, in some embodiments (discussed in greater detail below), the monitoring device compares a current response time for messages exchanged between a pair of nodes in the network topology to a representative response time for the communication link interconnecting the pair of nodes. The monitoring device determines deviations between the current response time and the representative response time for the communication link interconnecting the pair of nodes and identifies a network anomaly when the deviation increases over a threshold amount. In addition, in some embodiments, the network anomaly may be further classified as a link fault/failure, a bit rate error/failure, a buffer overrun, a device fault/failure, or the like, depending on a magnitude of deviation, response times for neighboring/adjacent nodes, response times for other communication links, and the like.

Illustratively, these techniques may be performed by hardware, software, and/or firmware, such as in accordance with the "monitoring" process 244 and/or "network topology" process 248, which may contain computer executable instructions executed by the processor 220 (or independent processor of interfaces 210) to perform certain functions.

Figure 3:
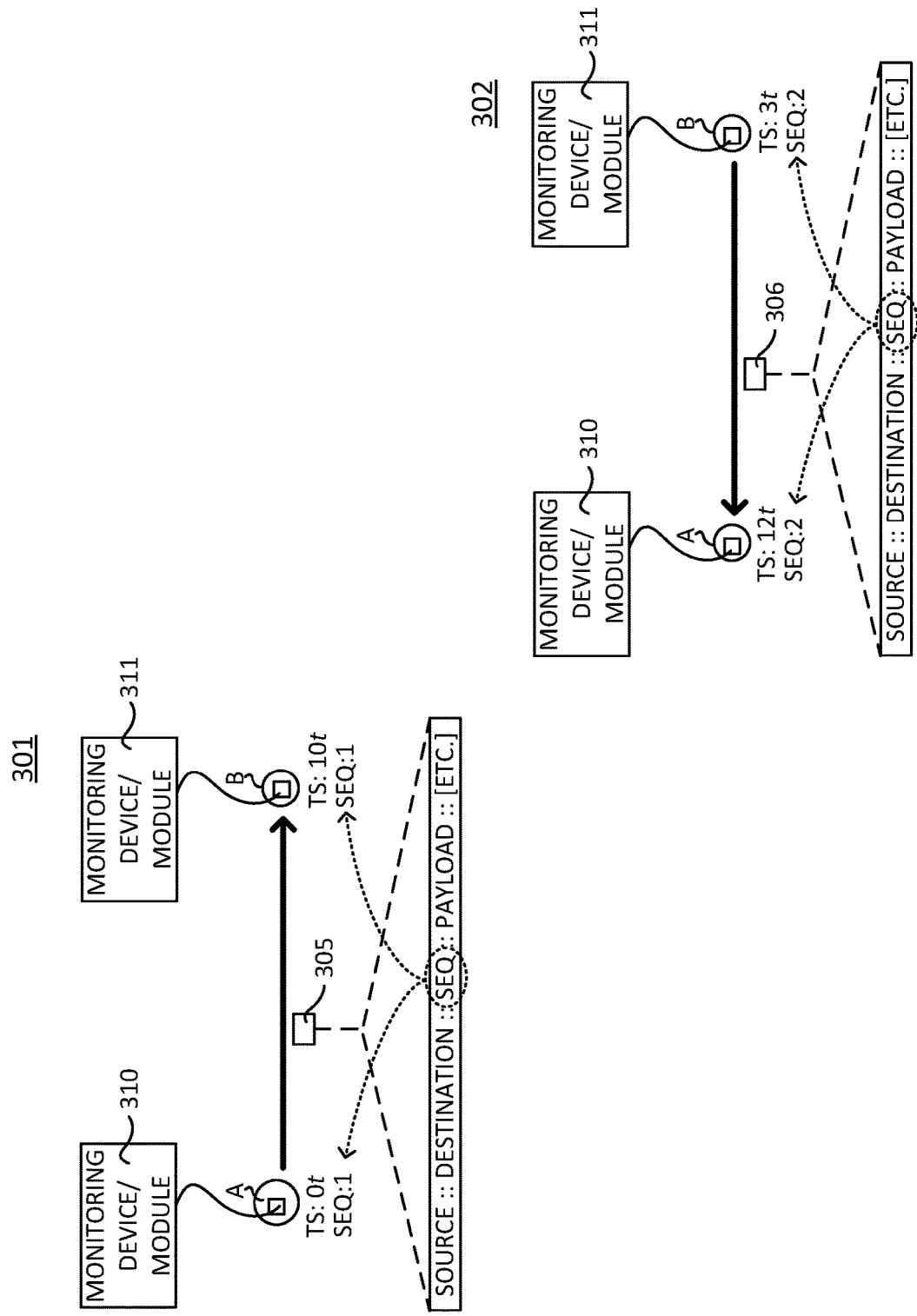
FIG. 3 illustrates schematic diagrams for a pair of nodes exchanging messages or packets.

FIG. 3 illustrates schematic diagrams of a pair of nodes exchanging messages or packets. For example, as shown, FIG. 3 includes a diagram 301 and a diagram 302 which collectively show messages exchanged between a node A and a node B. More specifically, diagram 301 shows a node A sending a packet 305 to a node B, and diagram 302 shows node B sending a packet 306 to node A. The exchange shown in diagram 301 and diagram 302 may be used to determine one or more paired latency values and/or paired latency distributions for communications between nodes—e.g., node A and node B.

As shown in FIG. 3, node A and node B are also configured to include respective monitoring modules 310 and 311. Notably, monitoring modules 310 and 311 may be part of a larger distributed monitoring device/system, and may send information related to packet tracking, time stamps, latency, and the like, to a remote module/device for further processing (or storage). In addition, monitoring modules 310 and 311 may be configured to execute one or more processes, such as monitoring process 244 and/or network topology process 248 (discussed above). It is appreciated that FIG. 3 and discussion herein are provided for purposes of exemplary embodiments, which are not to be limited to a particular protocol (e.g., transport layer protocol TCP, etc.).

Operatively, monitoring modules 310 and 311 in respective node A and node B time stamp "TS" packets on transmission and on reception. For example, in diagram 301, monitoring module 310 time stamps a packet 305 at 0t when node A sends packet 305 to node B. Similarly, monitoring module 311 time stamps packet 305 on reception by node B at 10t. With respect to tracking the time stamps and time stamp data for an exchange between nodes—here, TS=0t and TS=10t—monitoring modules 310 and/or 311 operably associate and/or assign respective time stamps with/to packet 305 based on one or more unique message identifiers. For example, unique message identifiers can include a sequence number (SEQ: 1) (shown in FIG. 3), a packet header, packet type, packet size, payload data, a byte size data, acknowledge (ACK) data or identifier, and the like. In this fashion, monitoring module 310 and/or monitoring module 311 determine a response time or latency value for packet 305 by comparing time stamps associated with packet 305 and determining a time difference there-between—e.g., a time difference between 0t and 10t yields a total latency value of 10t.

In some embodiments, monitoring modules 310 and/or 311 (or a remote monitoring device) employ statistical algorithms to classify each packet according to a particular attribute (e.g., a packet type) and determine attribute specific latency values. In this manner, latency and latency distributions between nodes can be determined with granularity (e.g., specific to packet attributes, etc.)

In diagram 302, monitoring module 311 time stamps packet 306 at 3t, and sends packet 306 to node A. Monitoring module 310 time stamps packet 306 on reception by node A at 12t. As shown in diagram 302, monitoring modules 310 and 311 associate or assign respective time stamps for packet 306 with a sequence number—SEQ: 2. As with diagram 301 (discussed above), a latency value or response time for packet 306 may be determined by a comparing respective time stamps associated with packet 306—e.g., a time difference between 3t and 12t yields a total latency value of 9t.

Packets 305 and 306 are tracked by monitoring modules 310 and 311 and associated with a paired latency value or paired response time for communications between node A and node B. Specifically, time stamps associated with each packet are analyzed to determine paired latency values. Further, these paired latency values may be analyzed according to a latency distribution graph. For example, one or more statistical algorithms may be employed to generate a latency distribution, and representative latency values may be derived from such latency distribution. For example, some representative latency values include an average or median latency or response time between node A and node B. Further, as mentioned, an average or median latency can be determined from all packets exchanged between pairs of nodes, and/or according to certain packet attributes.

Although FIG. 3 illustrates multiple monitoring modules—here, monitoring module 310 and 311—it is appreciated that a single monitoring module or device may be employed (e.g., monitoring traffic on the communication link between node A and node B, and/or any additional number of monitoring modules or devices may be used as appropriate. Further, although FIG. 3 illustrates a direct communication link between node A and node B, it is appreciated that any number of nodes or hops may be present and that the view shown herein in for purposes of illustration, not limitation.

Figure 4:
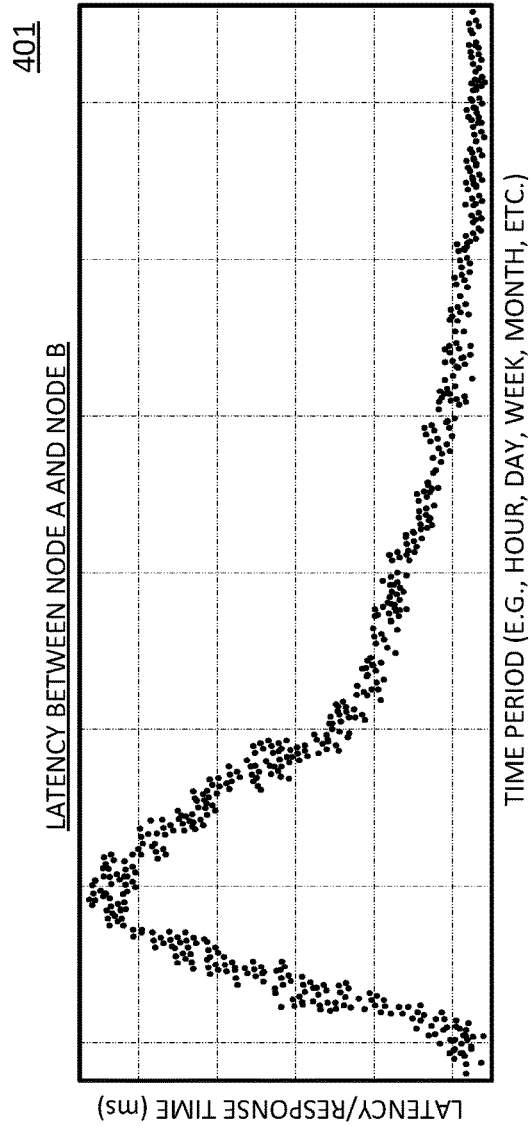
FIG. 4 illustrates latency graphs showing latency values or response times for messages exchanged between the pair of nodes shown in FIG. 3.
Figure 4:
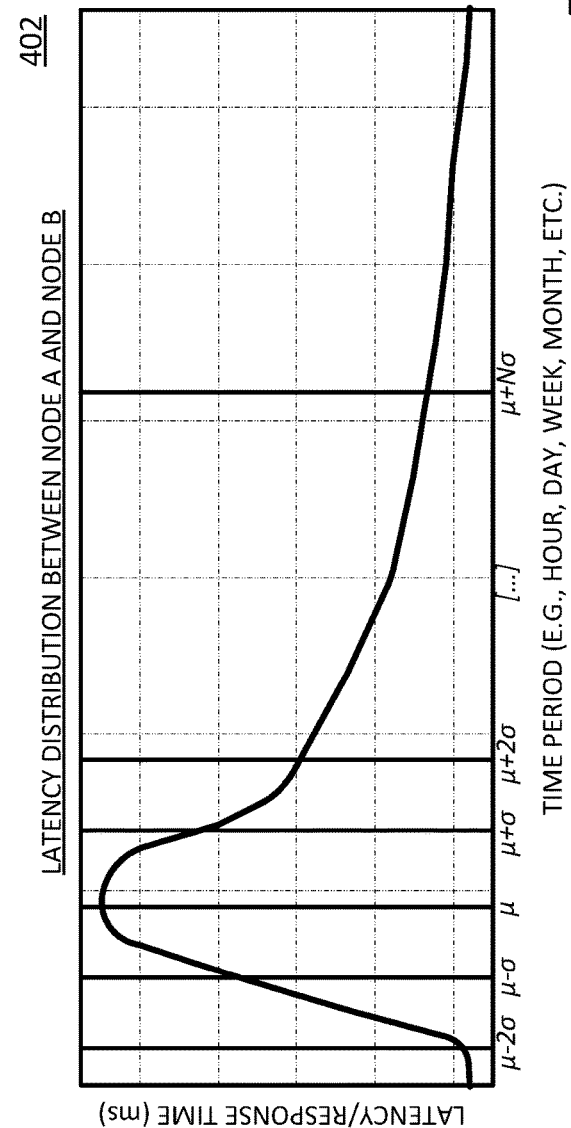

FIG. 4 illustrates latency graphs, here 401 and 402, showing latency values (or response times) (ms) for messages exchanged between node A and node B over a time period (e.g., an hour, a day, a week, a month, etc.). More specifically, graph 401 illustrates raw data points corresponding to a paired response time for packets exchanged between node A and node B. Graph 402 illustrates a statistical distribution or a latency distribution of the raw paired response times. Notably, as is appreciated by those skilled in the art, a time period shown in graph 402 may represent the same time period shown in graph 401, or it may only represent only a portion thereof. Further, as shown in graph 402, the raw paired response times over the time period conform to a log-normal distribution. Further, as shown in graph 402, the latency distribution includes a center line (µ) having one or more standards of deviation (µ+/−σ, µ+/−2σ, etc.) spaced apart on both sides. In some embodiments, the center line (µ) may represent latency values corresponding to a mean response time, a median response time, and the like. It is further appreciated that various other distribution curves or other distribution analysis may be used as appropriate (e.g., mean lines, bell-curve distributions, and the like).

In addition, as mentioned above, the latency distribution shown in graph 402 may also indicate one or more outlier latency values, which can be determined according to policies of the communication network and/or according to pre-determined thresholds. For example, certain outlier latency values may result from dropped packets, internal device buffering, or other network conditions not relevant to an initial network topology mapping. Accordingly, in some embodiments, these outlier latency values may be eliminated from an initial latency analysis or calculation since the outlier latency values may improperly skew representative latency value determinations. Notably, however, these outlier latency values may be important for subsequent network analysis and/or network troubleshooting. For example, these outlier latency values may indicate communications issues amongst nodes—e.g., when a measured response time is (statistically) greater than a median response time, a mean response time, and the like. Moreover, the latency distribution shown in graph 402, including the representative latency value (µ), may be used to annotate paired latency values for communication links between nodes, as shown in FIGS. 5-8.

Figure 5:
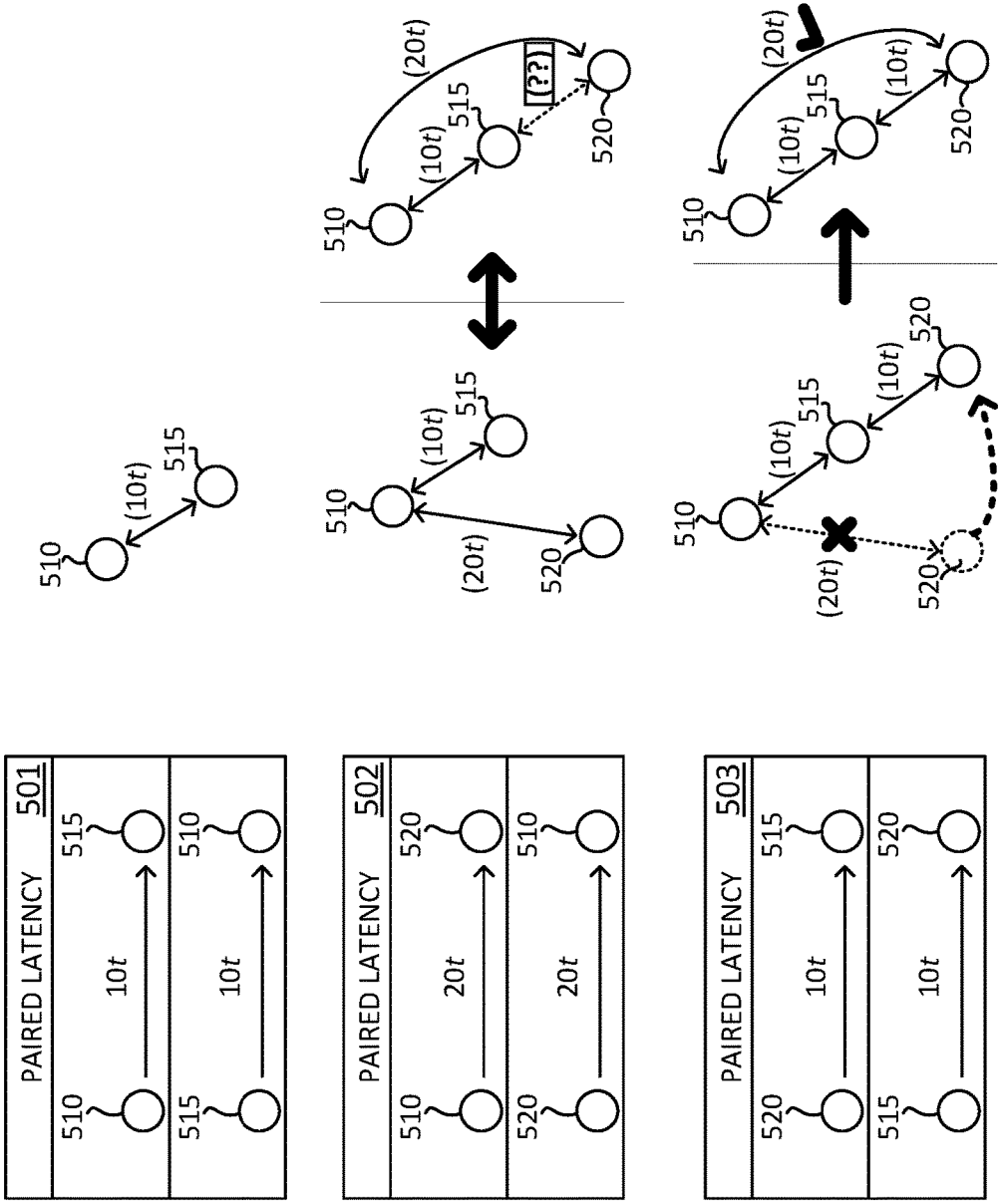
FIG. 5 illustrates schematic diagrams of potential network topologies for nodes in a communication network based on paired latency values or response times.

In particular, FIG. 5 illustrates schematic diagrams 501, 502, and 503, showing paired latency values for messages or packets exchanged between nodes 510, 515, and 520. Preferably, these paired latency values are determined from latency distributions, as discussed above (e.g., Nt+/−σ, etc.). As shown, latency chart 501 indicates a paired latency value between node 510 and 515 at 10t, latency chart 502 indicates a paired latency value between nodes 510 and 520 at 20t, and latency chart 503 indicates a paired latency value between nodes 520 and 515 at 10t.

As discussed above, in some embodiments, a monitoring device (or node) (e.g., device 200) monitors messages or packets exchanged between nodes—here, nodes 510, 515, and 520. For example, as shown, the monitoring device can determine paired response times that correspond to messages exchanged between node 510 and 515, messages exchanged between node 510 and 520, and messages exchanged between node 515 and 520. Based on these paired response times the monitoring device can further determine one or more latency distributions for paired response times between the nodes.

The monitoring device also determines a network topology consistent with the one or more latency distributions and generates a graph of a network topology, including communication links between the nodes, relative positions for the nodes and representative response times between the nodes (e.g., a median response time, other measures of a response time from the corresponding latency distribution, etc.).

As shown in FIG. 5, one or more potential network topologies are shown next to each paired latency response time. These potential network topologies represent possible network configurations, with certain communication links marked with an "x" to represent an inconsistency with the paired latency values shown in latency charts 501, 502, and 503, and/or an inconsistency with a threshold tolerance. For example, a network topology conforming to latency chart 501 includes a communication link or connection between node 510 and node 515, having an annotated latency value of 10t. However, multiple network topologies potentially conform to paired latency chart 502 (and also remain consistent with latency chart 501). Here, one potential network topology includes a direct communication link or connection between node 510 and node 520 (with an annotated latency value of 20t), and another potential network topology includes node 515 disposed between node 510 and node 520, including corresponding communication links. Notably, the potential network topology including node 515 disposed between node 510 and node 520 includes an unknown latency value (marked as "??") for the communication link between node 515 and node 520. Further latency information from latency chart 503 resolves the unknown latency value. Alternatively, or in addition, latency distribution information may also resolve ambiguity between multiple potential network topologies. For example, referring to the topology shown next to latency chart 503, assume a latency of 20t for direct communications between node 510 and node 520 represents an outlier latency value and/or a latency value outside a threshold tolerance. In this example, the direct communication link between node 510 and node 520 is marked with an X since the latency value of 20t is an outlier/outside tolerance. Further, the remaining latency value shown in latency chart 503 provides the previously unknown latency value as 10t, which validates the network topology having node 515 disposed between node 510 and node 520. Thus, the network topology consistent with the latency charts 501, 502, and 503, and latency distribution information (e.g., excluding outliers and/or response times outside of thresholds, etc.), includes node 515 disposed between nodes 510 and 520, with communication links there-between.

Figure 6:
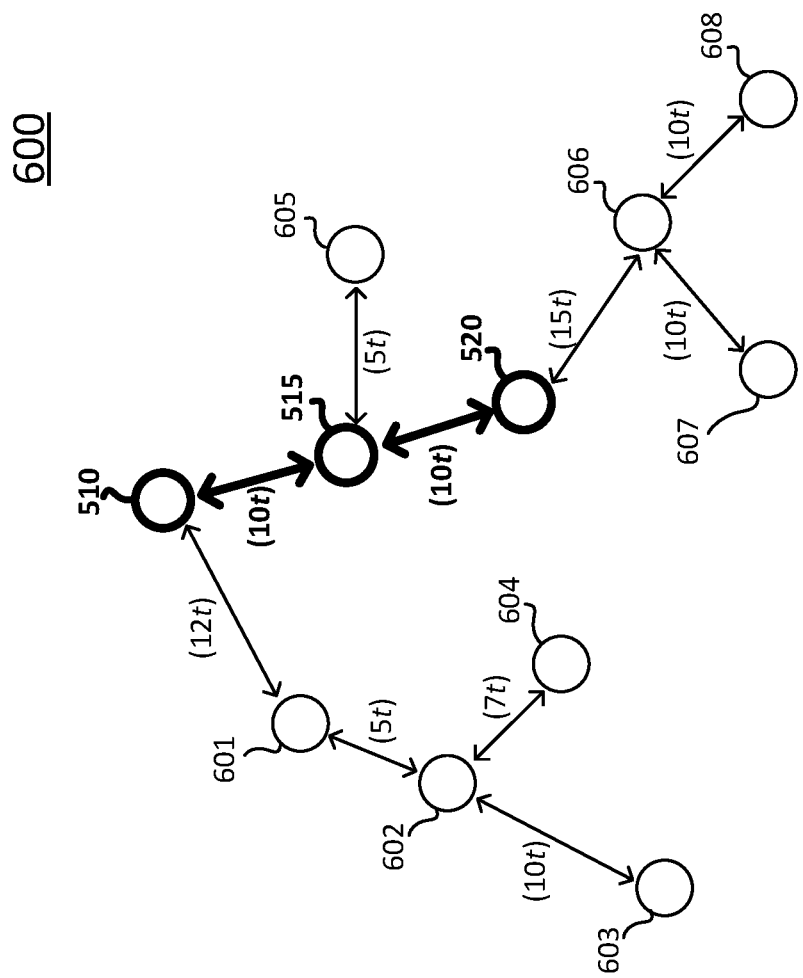
FIG. 6 illustrates a network topology graph of the nodes shown in FIG. 5.

FIG. 6 illustrates a network topology 600 for nodes 510, 515, and 520, as well as other nodes in the communication network. Preferably, network topology 600 is derived from paired latency response times and/or potential node topologies such as those shown in FIG. 5, as well as an analysis of latency distributions for communications between each of the nodes. As shown, network topology 600 shows communication links annotated with representative latency values or response times for packets exchanged between the nodes. These representative latency values, as discussed above, may represent an average or median latency value for all packets exchanged between two corresponding nodes, and/or for packets having particular attributes.

Figure 7:
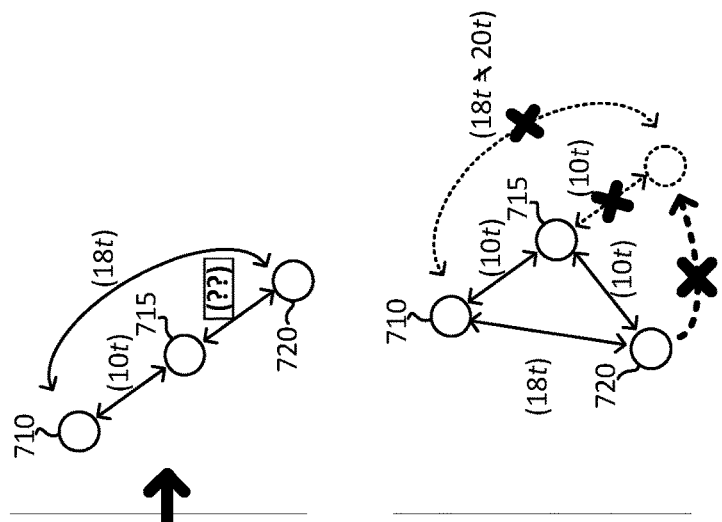
FIG. 7 illustrates schematic diagrams of potential network topologies for nodes in a communication network based on paired latency values or response times.
Figure 7:
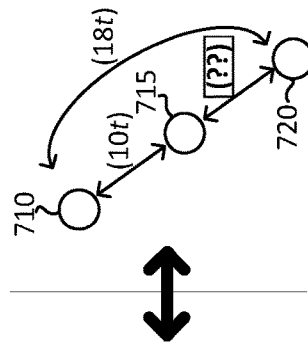
Figure 7:
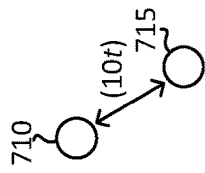
Figure 7:
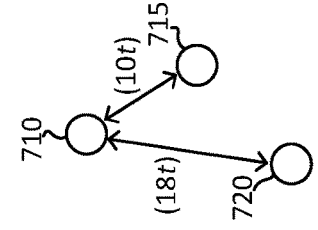
Figure 7:
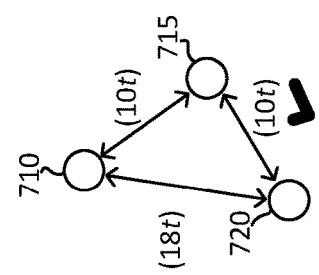

FIG. 7 illustrates exemplary schematic diagrams of potential network topologies for nodes in a communication network based on paired latency values or response times (similar to FIG. 5). Here, FIG. 7 includes schematic diagrams 701, 702, and 703, showing paired latency values for packets exchanged between nodes 710, 715, and 720. In particular, latency chart 701 shows a paired latency value between node 710 and 715 at 10t, latency chart 702 shows a paired latency value between nodes 710 and 720 at 18t, and latency chart 703 shows a paired latency value between nodes 720 and 715 at 10t. As discussed above, the paired latency values in paired latency charts 701, 702, and 703 may be determined from latency distributions (e.g., Nt+/−σ, etc.) of response times for messages exchanged between the nodes. In addition, FIG. 7 also illustrates potential network topologies next to respective latency charts.

As shown in FIG. 7, a network topology that conforms to latency chart 701 includes a communication link between node 710 and node 715, and includes an annotated latency value (e.g., a representative latency value) of 10t. Notably, multiple network topologies are consistent with latency chart 702 (and consistent with latency chart 701). For example, one potential network topology includes a direct link or direct connection between node 710 and node 720, having an annotated latency value of 18t, while another potential network topology includes node 715 disposed between node 710 and node 720, having an unknown latency value "??" for the communication link connecting node 715 and node 720.

Additional latency distribution information and/or additional latency values (e.g., latency chart 703) may resolve ambiguity between the multiple potential network topologies. Specifically, latency chart 703 indicates a latency value for communications between nodes 715 and 720 at 10t, which invalidates the network topology having node 715 disposed between nodes 710 and 720. That is, the network topology having node 715 disposed between nodes 710 and 720 results in a total latency value of 20t from an aggregation of (10t) between 710-715 and (10t) between 715 and 720, while the latency value between nodes 710 and 720 is only 18t. In this fashion, the network topology, showing node 715 disposed between node 710 and 720, is inconsistent with the latency values shown in latency chart 703. Thus, the network topology consistent with the latency charts 701, 702, and 703, includes a direct communication link between node 710 and node 720, a direct communication link between node 720 and node 715, and a direct communication link between node 715 and node 710. Notably, in this example, the additional latency distribution information such as indications of outlier response times, thresholds, and the like, was not employed to determine the appropriate network topology.

Figure 8:
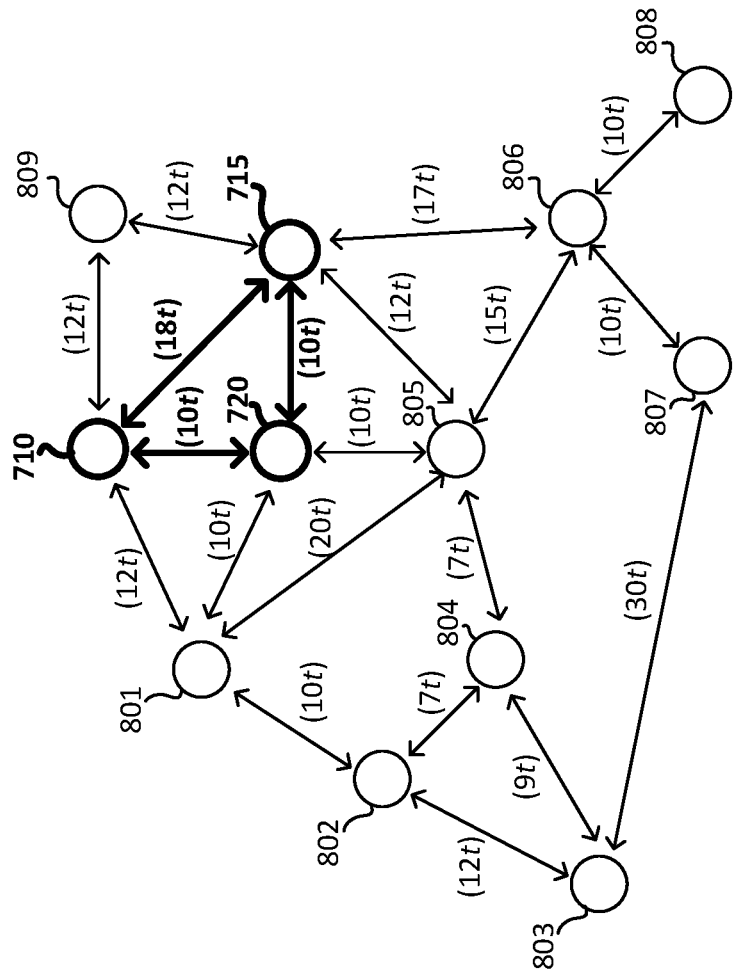
FIG. 8 illustrates a network topology graph of the nodes shown in FIG. 7.

FIG. 8 illustrates a network topology 800, showing the network topology for nodes 710, 715, and 720, as well as a broader network topology of other nodes in the communication network. Network topology 800 is preferably derived, in part, from paired latency values (e.g., latency charts 701, 702, 703), and/or from an analysis of latency distributions for communications between the nodes. With respect to determining network topology 800, in some embodiments, a monitoring device may compare, aggregate, or otherwise analyze the latency distributions of response times between nodes to determine relative positions for each node in the communication network. Further, as discussed above, these latency distributions may be refined according to tolerances and/or thresholds to eliminate certain response times (e.g., outliers, outside thresholds, etc.), which certain response times may improperly skew initial network topology mapping (e.g., skew median/mean lines in the corresponding latency distributions).

As shown, network topology 800 includes communication links annotated with representative latency values or response times between the nodes. The representative latency values, as discussed above, may represent an average or median response time for all packets exchanged between two corresponding nodes, and/or, in some embodiments, the representative latency values may also include response times for certain types of packets.

FIGS. 5-8, collectively, illustrate exemplary techniques to determine network topologies based on latency distributions, tolerances, thresholds, and the like. Further, it is appreciated that the example network topologies shown in FIGS. 5-8, including the illustrated orientations, latency values, and the like, are provided for purposes of discussion, not limitation. Various types of node topologies, orientations, latency values, and the like, may be used as appropriate.

As discussed above, the network topology, including representative latency values associated with communication links between nodes, may be further used to identify, detect, or otherwise determine a network anomaly in the network topology as shown in FIGS. 9-12. As discussed in greater detail below, the network monitoring device generally compares a current response time for messages exchanged between a pair of nodes in the network topology to a representative response time for the communication link interconnecting the pair of nodes. When the current response time deviates from the representative response time for the communication link interconnecting the pair of nodes (e.g., by a threshold amount), the monitoring device can identify such deviation as a network anomaly in the network topology. In addition, the network anomaly may be further classified as a link fault/failure, a bit rate error/failure, a buffer overrun, a device fault/failure, or the like, depending on a magnitude of deviation, response times for neighboring/adjacent nodes, response times for other communication links, and the like.

Figure 9:
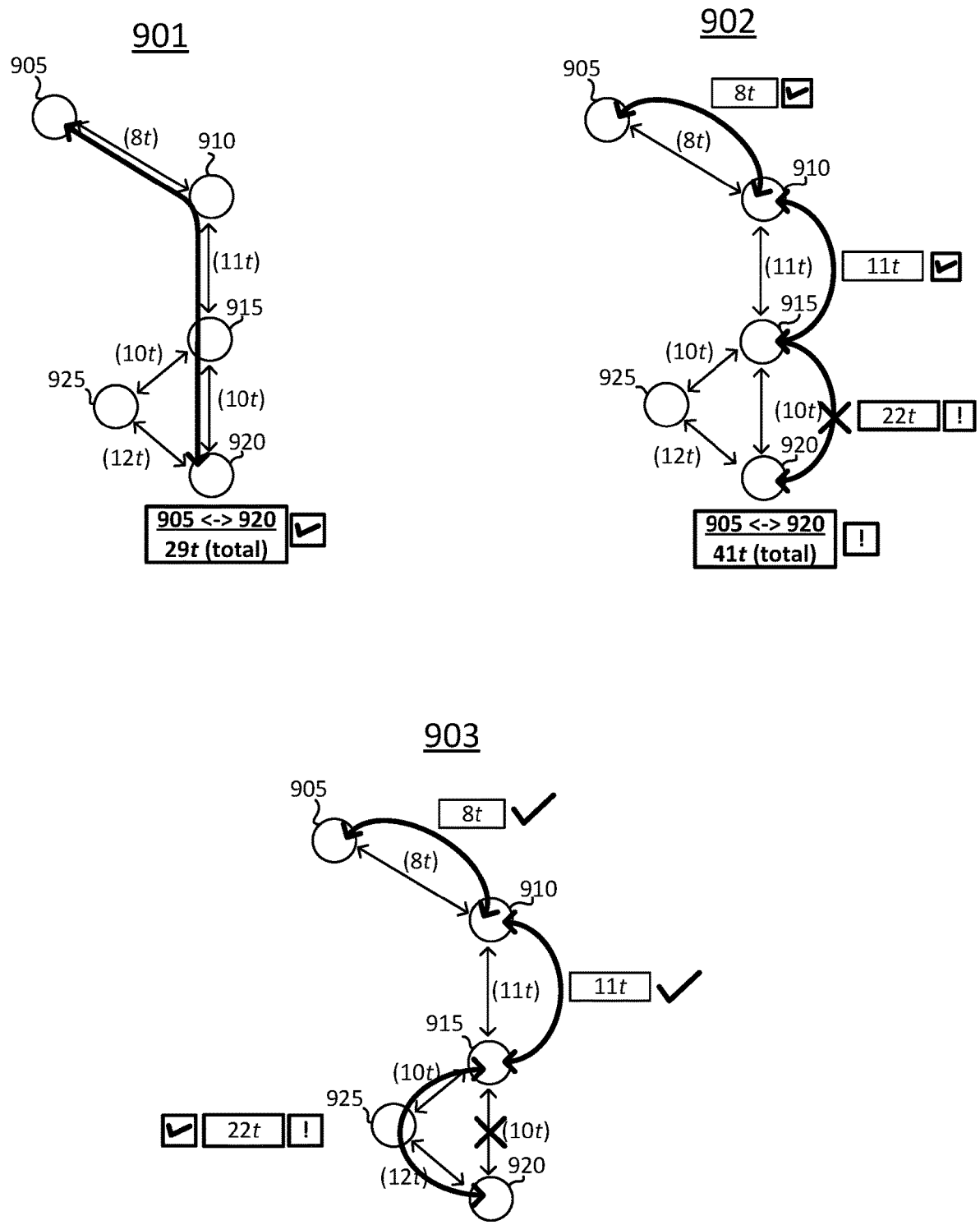
FIG. 9 illustrates schematic diagrams of an exemplary network link anomaly or link fault in a network topology.

Referring specifically to FIG. 9, schematic diagrams 901, 902, and 903 illustrate a network link anomaly/fault in a network topology. Diagrams 901, 902, and 903 illustrate a network topology that includes nodes 905, 910, 915, and 920, and corresponding communication links interconnecting the nodes. As shown, each communication link is associated with a representative latency value, which may include a mean response time or a median response time derived from a latency distributions of response times for messages exchanged between corresponding nodes.

Diagram 901 particularly shows a network path or communication path between nodes 905, 910, 915 and 920. In addition, an aggregated latency value for the network path is 29t, which substantially corresponds to a sum of the representative latency values for each communication link in the network path. However, referring to diagram 902, a network anomaly is detected based on an increase in the aggregated latency value for the network path. Here, the aggregated latency increased to 41t, which deviates from the representative response time by one or more threshold values. As discussed above, a threshold value may be determined for response times over communication links based on, for example, latency distributions of response times over the communication links for normal traffic conditions. These threshold values distinguish normal or expected ranges of response times from outlier or problematic response times, which may be caused by a network anomaly/fault.

A monitoring device (e.g., device 200) compares a current response time (e.g., an aggregated response time of 41t) to the representative response time (e.g., a sum of the representative latency values for each communication link in the network path or 29t) and identifies a network anomaly when the current response time deviates from the representative response time by a threshold value or amount (e.g., +/−5t, or any other value as appropriate).

As shown, the monitoring device identifies the network anomaly and further analyzes individual response times for each communication link in the network path between nodes 905, 910, and 920 in order to isolate and classify the network anomaly/fault. For example, in diagram 902, the monitoring device compares individual representative response times for each communication link in the network path to a measured response time for messages exchanged on the corresponding communication link. Based on deviations or differences between the measured response time and the representative response time, the monitoring device determines the response time between node 915 and node 920 is responsible for the increase in the aggregated response time for the network path between nodes 905, 910, and 920.

In diagram 903, the monitoring device classifies the network anomaly as a link fault/failure for the communication link between node 915 and node 920. Operatively, the monitoring device analyzes representative response times for communication links of corresponding adjacent or neighboring nodes relative to node 915 and node 920—e.g., here, communication links for node 925—and identifies an alternative portion of the network path that substantially corresponds to the increase in the aggregated response time. Specifically, the monitoring device determines the messages between node 915 and node 920 are likely re-routed through an alternative portion for the network path—here, through node 925—based on a comparison of a sum of the representative response times for messages over the communication link between nodes 915, 925, and 920 (i.e., 22t) and the increase in the aggregated response time (i.e., 22t). The monitoring device further classifies the network anomaly/fault as a link fault/failure between node 915 and node 920 since the alternative portion of the network path substantially corresponds to the increase in the aggregated response time.

Figure 10:
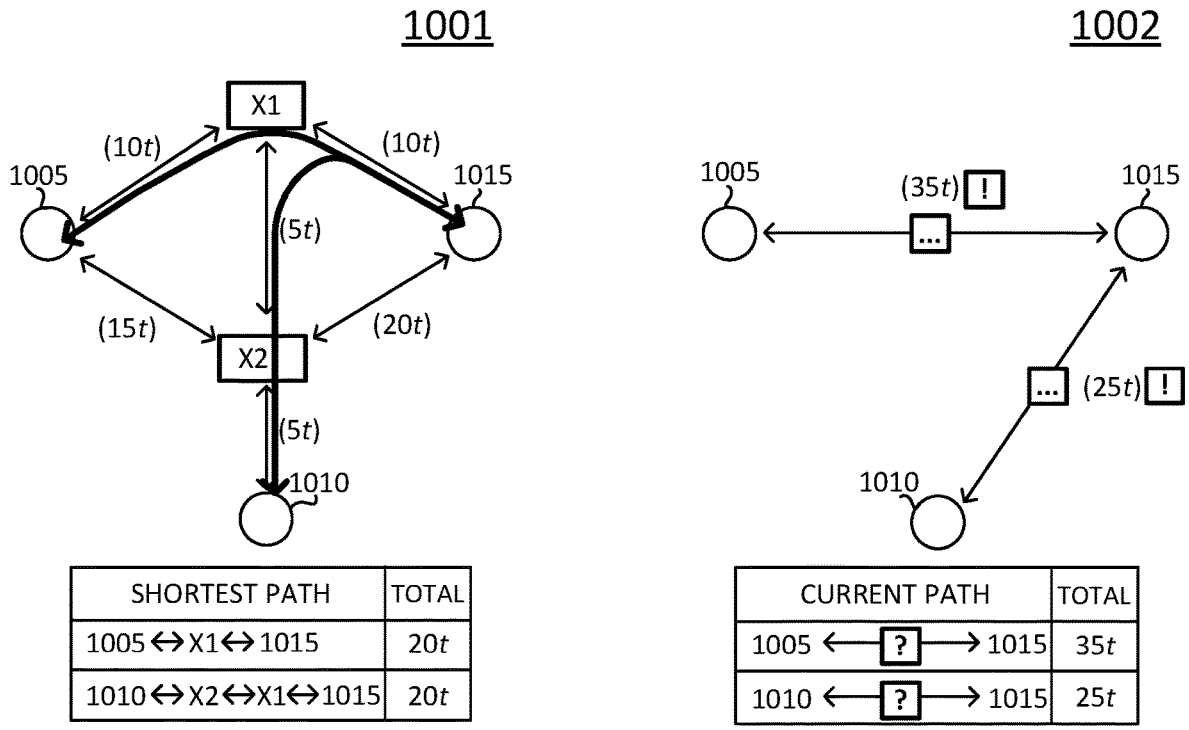
FIG. 10 illustrates schematic diagrams of an exemplary network device anomaly or device fault in a network topology.
Figure 10:
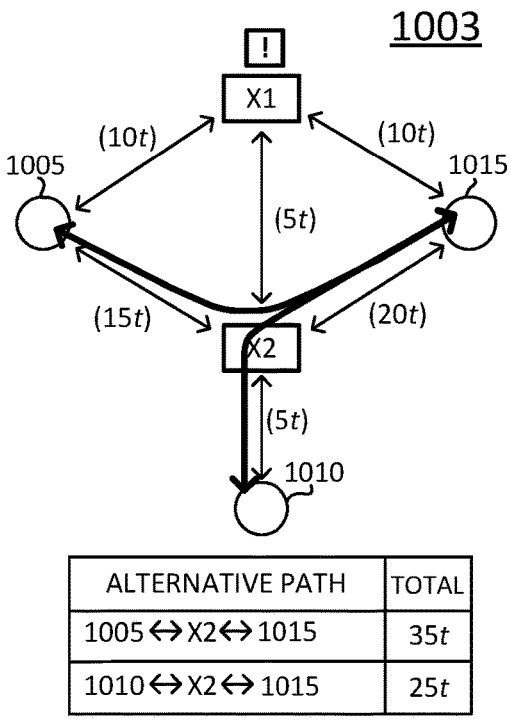

FIG. 10 illustrates schematic diagrams 1001, 1002, 1003, showing a network device anomaly/fault in a network topology. Diagrams 1001, 1002, and 1003 illustrate a network topology that includes nodes 1005, 1010, 1015, switches X1, X2, and corresponding communication links connecting the nodes/switches. As shown, each communication link is associated with a representative latency value, which may include a mean response time or a median response time derived from a latency distributions of response times for messages exchanged between corresponding nodes/switches.

Diagram 1001 particularly shows two network paths, one network path between node 1005 and node 1015, traversing switch X1, and another network path between node 1010 and node 1015, traversing switch X2. The monitoring device determines a "shortest path" for each network path based on respective aggregated representative response times of communication links for each network path. Here, the shortest path between node 1005 and node 1015 is 20t, and the shortest path between node 1010 and node 1015 is 20t.

In diagram 1002, the monitoring device detects a network anomaly/fault due to an increased response time for each network path—e.g., the aggregated response time for the network path between node 1005 and node 1015 increased to 35t and the aggregated response time for the network path between node 1010 and node 1015 increased to 25t. As mentioned above, the network anomaly/fault can be identified when the current response time for a network path deviates from the aggregated representative response time for the network path by a threshold amount. Here, assume the increased response times for the network paths exceed respective threshold values.

The monitoring device can further classify the network anomaly shown in diagram 1002 as a device fault/failure. For example, in diagram 1003, the monitoring device analyzes representative response times for communication links for alternative network paths between the nodes. As shown, the monitoring device determines an aggregated response time (35t) for an alternative network path between node 1005 and node 1015, traversing switch X2 (and avoiding switch X1), substantially corresponds to the increased aggregated response time between the nodes (35t). The monitoring device also determines an aggregated response time (25t) for an alternative network path between node 1010 and node 1015, also traversing switch X2 (and avoiding switch X1), substantially corresponds to the increased response time between the nodes (25t). The monitoring node further classifies the network anomaly as a device fault/failure at switch X2 since each alternative network path avoids traversing switch X2. In some embodiments, the monitoring device can generate an alert (e.g., for a system administrator) indicating one of the devices (e.g., switch X1) is malfunctioning in the network topology. Further, the monitoring device may also provide one or more alternate paths to one or more nodes in the network topology—here, an alternative path traverses switch X2. The one or more nodes in the network topology receive the alternate path information and can update respective routing tables, and the like.

Figure 11:
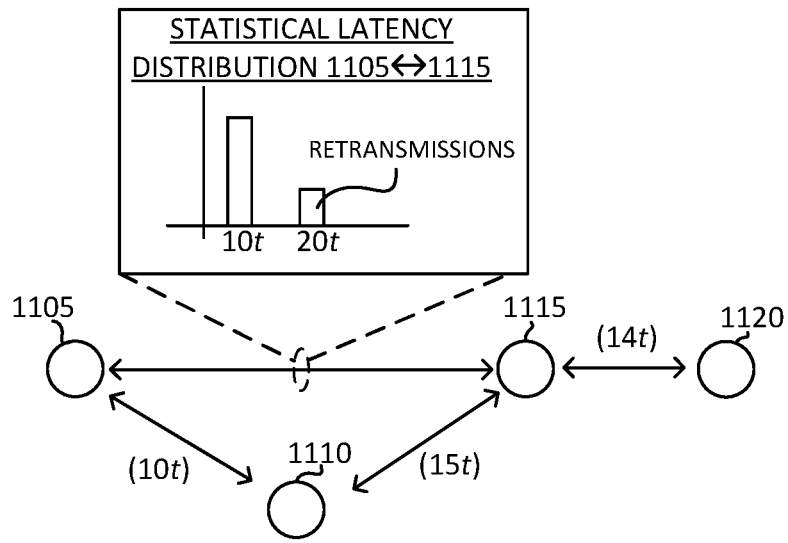
FIG. 11 illustrates schematic diagrams of another exemplary network link/device anomaly or link/device fault in a network topology.
Figure 11:
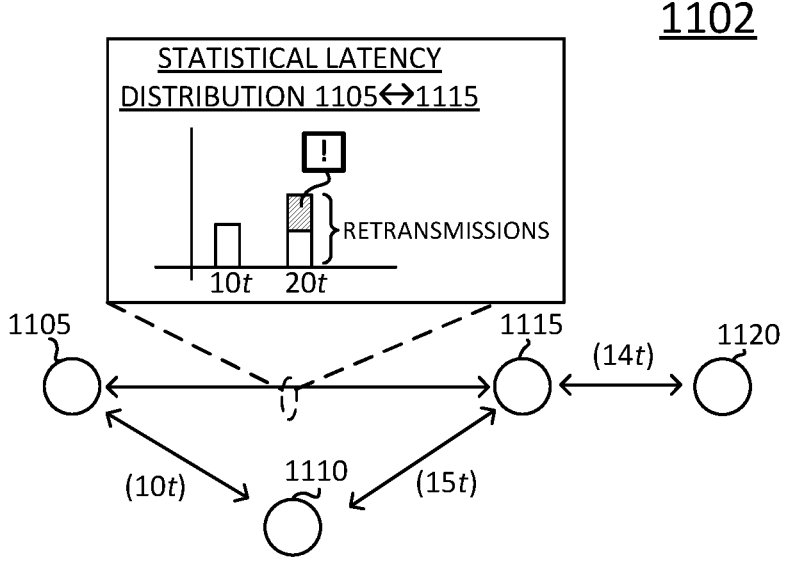

FIG. 11 illustrates schematic diagrams of another exemplary network link/device anomaly or link/device fault in a network topology. In particular, FIG. 11 provides diagrams 1101 and 1102, showing statistical latency distributions between node 1105 and node 1115. Notably, these statistical latency distributions include a representative latency value 10t that corresponds expected response times (e.g., within a "normal" or expected distribution), and a representative retransmission latency value of 20t that corresponds to retransmission response times (e.g., within a "normal" or expected retransmission distribution). As shown in diagram 1101, a large portion of the total response times match and/or fall within or a threshold of the normal transmission response time (10t), while a small portion of the response times match and/or fall within a threshold of the representative retransmission value (20t).

In diagram 1102, the statistical latency distribution shows a decrease in portion of total response times that match the representative latency value 10t and an increase in the portion of the total response times that match the representative retransmission value 20t. Operatively, the monitoring node monitors these statistical latency distributions for response times and/or retransmission response times between nodes, and identifies a network anomaly/fault for an increase in the distribution of representative retransmission latency values, as shown in diagram 1102. In some embodiments, the monitoring node may further identify the network anomaly/fault when there is a corresponding decrease in the distribution of representative transmission latency values (e.g., a decrease in the 10t response time distribution). The monitoring device may also classify the network anomaly/fault as a bit-error fault and/or a bad link between node 1105 and 1115 due to this shift in the latency distribution—e.g., a decrease in normal transmission instances and/or an increase in retransmission instances.

Figure 12:
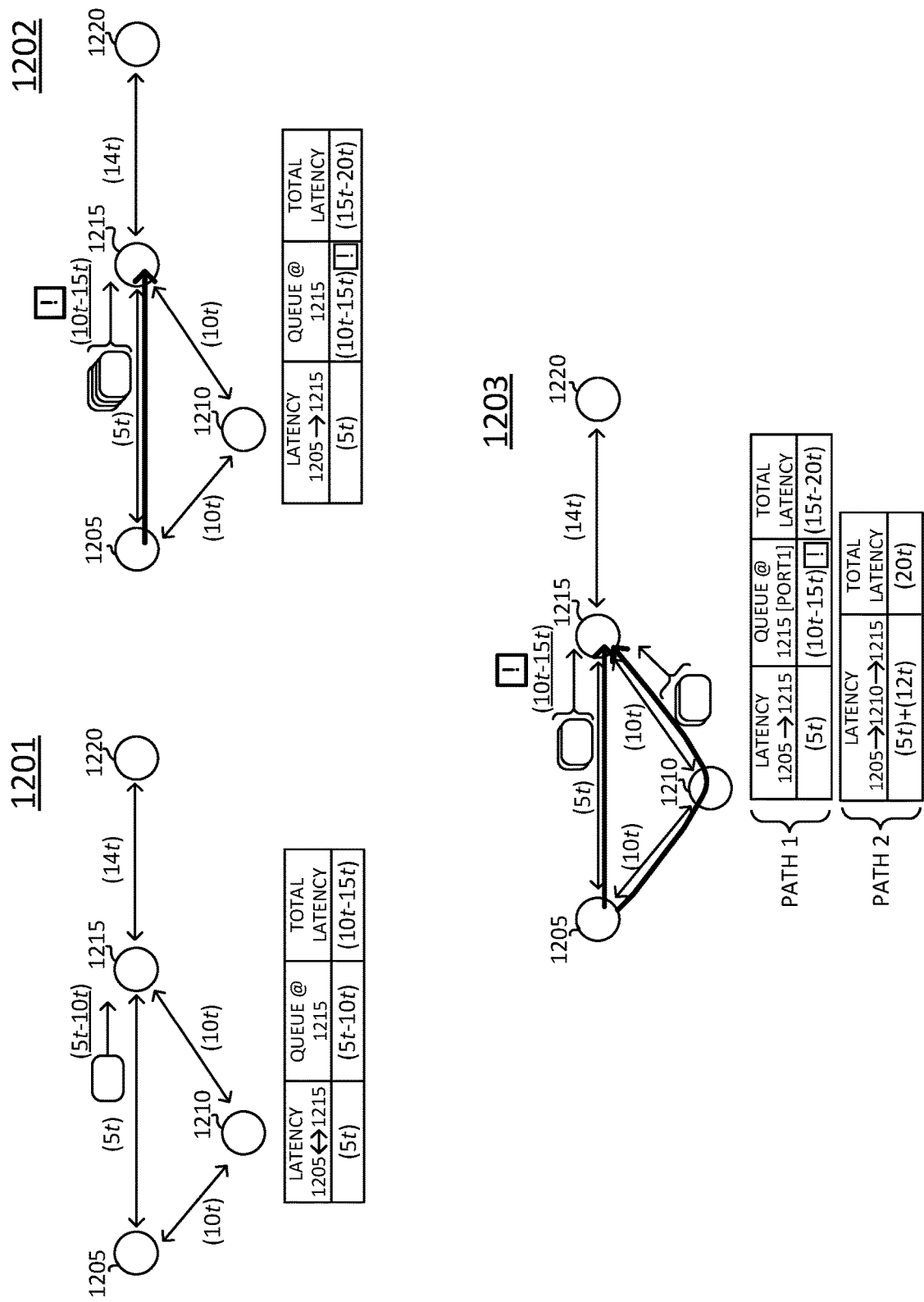
FIG. 12 illustrates schematic diagrams of an exemplary network device buffer anomaly or device buffer fault in a network topology.

FIG. 12 illustrates schematic diagrams of an exemplary network device buffer anomaly or device buffer fault in a network topology. For example, FIG. 12 provides diagrams 1201, 1202, and 1203, showing a network topology that includes nodes 1205, 1210, 1215, and 1220, as well as communication links interconnecting the nodes. Notably, the communication link between node 1205 and node 1215 has a base response time, indicated by a representative response time 5t, and a variable buffer or queue response time at node 1215, shown next to a message/packet sent from node 1205 to node 1215. This buffer or queue response time causes a latency variation (e.g., an increase) from the representative response time 5t, and may be determined from statistical latency distributions for messages or packets exchanged between node 1205 and node 1215, as is appreciated by those skilled in the art.

As shown, diagram 1201 shows a single packet/message transmitted from node 1205 to node 1215 and a variable buffer response time of 5t-10t at node 1215. In this fashion, a total response time or latency between node 1205 and node 1215 is 5t-10t.

Diagram 1202 particularly shows a traffic burst in the network topology, represented by multiple packets/messages transmitted over the communication link between node 1205 and node 1215. The traffic burst in the network topology causes the variable buffer response time for node 1215 to increase from 10t-15t, and a corresponding total response time between node 1205 and node 1215 to increase to 15t-20t. In addition, the traffic burst may also cause a buffer or queue overflow condition at node 1215, resulting in dropped packets/messages. Operatively, the monitoring device can determine the variable buffer response time for node 1215 and changes to the variable buffer response time from, for example, time stamp data associated with each packet/message. In this example, each packet/message may be time stamped by node 1215 (and/or by a monitoring module executed by node 1215) at ingress and egress relative to node 1215. The monitoring device may determine the variable buffer response time for node 1215 based on a time difference between the ingress and egress time stamps. Alternatively (or in addition to the time stamp data), the statistical latency distributions for response times between node 1205 and node 1215 may also indicate the variable buffer response time, as well as changes to the variable buffer response time due to traffic bursts in the network topology.

Still referring to diagram 1202, the monitoring device determines the increase in the response time for node 1215 corresponds to an increased buffer time and/or a buffer overrun at node 1215. Here, the monitoring device further identifies this increased buffer time and/or a buffer overrun as a network anomaly/fault in the network topology.

One or more corrective actions may be employed to address the increased buffer time and/or the buffer overrun. For example, in diagram 1203, the monitoring device and/or a system administrator may instruct node 1205 to reroute portions of the traffic to an alternative path (e.g., through node 1210) thereby reducing the number of packets/messages received at a particular port of node 1215. In turn, the buffer time and/or buffer overrun for node 1215 may likewise decrease.

FIGS. 9-12, collectively, illustrate exemplary techniques to determine network anomalies/faults in a network topology by comparing a current response time for messages exchanged between a pair of nodes in the network topology to a representative response time for the communication link interconnecting the pair of nodes. Depending on the network topology and the latency distribution of response times, the techniques may further classify the network anomaly/fault as, for example, a link fault/failure, a bit rate error/failure, a buffer overrun, a device fault/failure, or the like, depending on a magnitude of deviation, response times for neighboring/adjacent nodes, response times for other communication links, and the like. In some embodiments, corrective action can be taken to address the network anomaly, including, for example, updating routes to avoid bad links and/or malfunctioning devices, as well as replacing devices (e.g., switches, routers, etc.) when the anomaly indicates the device is not working properly.

Further, it is appreciated that the example network topologies shown in FIGS. 9-12, including the illustrated orientations, latency values, and the like, are provided for purposes of discussion, not limitation, as a link fault/failure, a bit rate error/failure, a buffer overrun, a device fault/failure, or the like, depending on a magnitude of deviation, response times for neighboring/adjacent nodes, response times for other communication links, and the like. Various other types of node topologies, orientations, latency values, and the like, may be used as appropriate.

Figure 13:
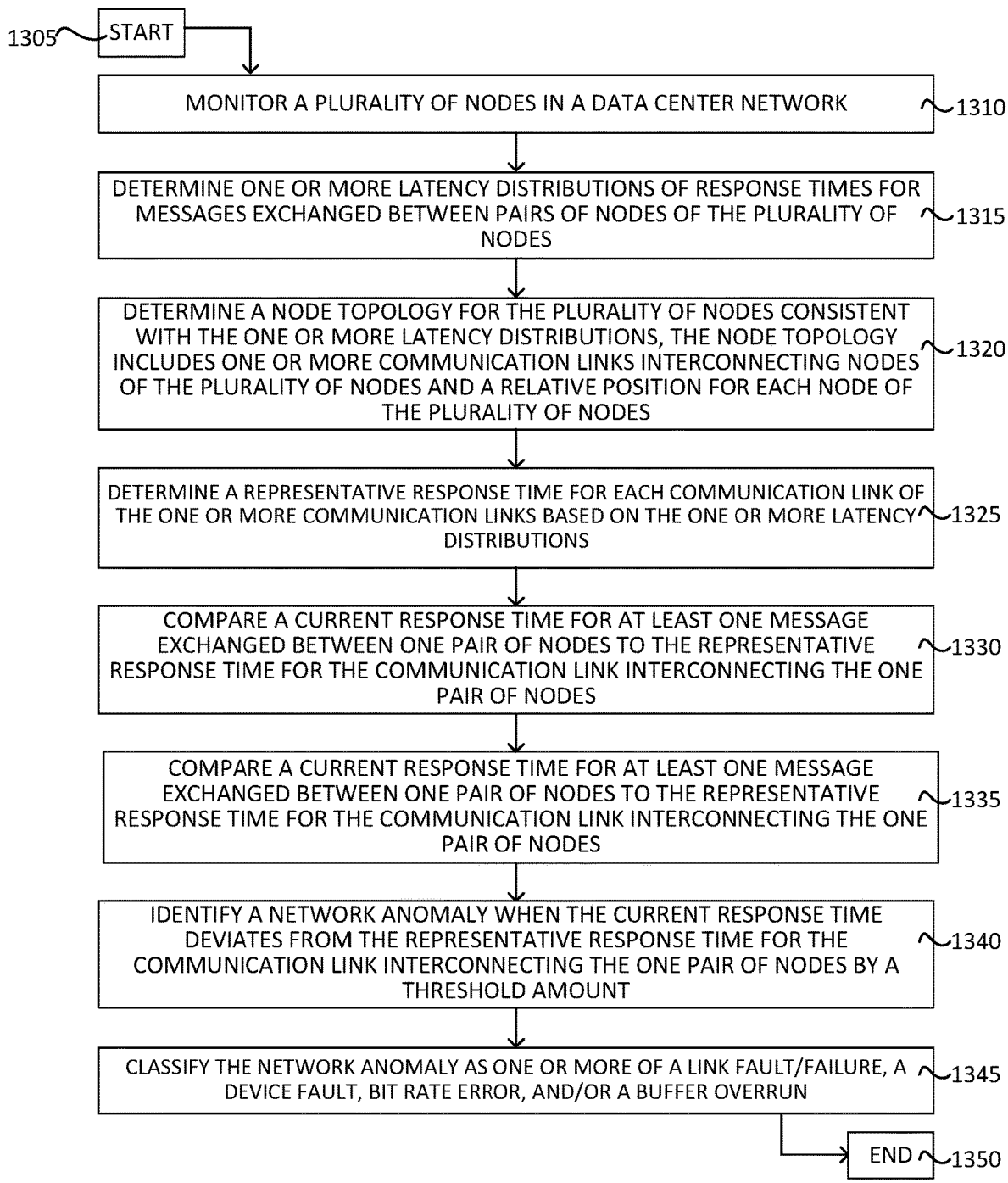
FIG. 13 illustrates an example simplified procedure for detecting a network anomaly or fault based on latency distributions in a network topology.

FIG. 13 illustrates an example simplified procedure 1300 for detecting a network anomaly or fault based on latency distributions in a network topology. Procedure 1300 begins at step 1305 and continues to step 1310 where, as discussed above, a monitoring device monitors a plurality of nodes in a data center network. The monitoring device further determines, at step 1315, one or more latency distributions of response times for messages exchanged between pairs of nodes of the plurality of nodes and also determines, at step 1320, a node topology consistent with the latency distributions. Notably, the node topology preferably includes one or more communication links interconnecting nodes of the plurality of nodes and a relative position for each node of the plurality of nodes.

The monitoring device further determines, at step 1325, a representative response time for each communication link in the node topology based on the one or more latency distributions. For example, as discussed in greater detail above, the representative response time can include a median response time, an average response time, and the like. Further, in some embodiments, the representative response time may correspond to a range of response times corresponding to a variable buffer/queue for one or more nodes in the topology (e.g., ref. FIG. 12).

The monitoring device generally detects a network anomaly for the network topology by comparing, at step 1335, current response times for messages exchanged between a pair of nodes to the representative response time for the communication link interconnecting the pair of nodes. When the current response time deviates from the representative response time for the communication link, the monitoring device identifies, at step 1340, a network anomaly in the network topology. In some embodiments, one or more thresholds may be used to provide a range of acceptable deviation from the representative response time.

In addition to identifying the network anomaly/fault, the monitoring device can further classify the network anomaly, shown at step 1345. For example, the monitoring device can classify the network anomaly as one of a link fault/failure, a device fault, bit rate error, and/or a buffer overrun, and the like. For example, the monitoring device may classify the network anomaly/fault as a link fault/failure when the current response time substantially corresponds to a network path in the node topology that traverses one or more communication links interconnecting a third node and one or more of the nodes in the pair of nodes.

As another example, the monitoring device may classify the network anomaly/fault as a device fault/failure when a network path matching the current response time avoids one or more nodes disposed between the pair of nodes. In a further example, the monitoring device may determine retransmission latency distributions, representative retransmission response times, and current retransmission response times and classify the network anomaly/fault as a bit error fault based on an increase in the retransmission latency distribution.

In a further example, the monitoring device can classify the network anomaly fault/failure as a buffer or queue overrun at one node of the pair of nodes. As discussed in greater detail above, the monitoring device can determine one or more variable buffer response times for a communication link (in addition to the representative response time). During a traffic burst (or an increase in the traffic in the network), the variable buffer response time may increase beyond a threshold and may cause packets to be dropped. In this example, the monitoring device can determine the buffer at one node of the pair of nodes is overrun and classify the network anomaly/fault as a buffer or queue overrun. Further, the monitoring device (and/or system administrator) may signal for portions of traffic to be re-routed along an alternative path to reduce the load on the buffer for the node.

Procedure 1300 subsequently ends at step 1350, but may continue on to step 1310 where, as discussed above, the monitoring device monitors the plurality of nodes in the data center network. It should be noted that while certain steps within procedure 1300 may be optional, and further, the steps shown in FIG. 13 are merely examples for illustration—certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for monitoring nodes in a data center network, mapping corresponding network topologies based on a statistical analysis of response times (e.g., latency distributions) between pairs of nodes, and determining network anomaly/fault conditions for the network topology. The techniques described herein provide simple solutions to determine and classify network anomalies/faults based on comparisons between representative response times for communication links in the network topologies and current response times between pairs of nodes in the network topology.

While there have been shown and described illustrative embodiments to determine latency distributions amongst pairs of network nodes, network topology mapping, and the like, it is to be understood that various other adaptations and modifications may be made within the spirit and scope of the embodiments herein. For example, the embodiments have been shown and described herein using response times in factors of a generic time (t), however it is appreciated that latency or response times may be measured in specific fractions, or portions of seconds (e.g., milliseconds, microseconds, etc.) or other appropriate measures of time.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
monitoring, by a network monitoring device, a plurality of nodes in a data center network, the plurality of nodes being arranged in a network topology of one or more communication links interconnecting nodes of the plurality of nodes and a relative position for each node of the plurality of nodes;

determining, by the network monitoring device, one or more latency distributions of response times for messages exchanged between pairs of nodes of the plurality of nodes;

creating a map of the network topology of the plurality of nodes based on a statistical analysis of the one or more latency distributions of raw paired response times that are representative of latency values, which corresponds to expected response times and retransmission latency value to thereby determine the network topology;

determining a representative response time for each communication link of the one or more communication links based on the one or more latency distributions;

comparing, by the network monitoring device, a current response time for at least one message exchanged between one pair of nodes to the representative response time for the communication link interconnecting the one pair of nodes; and identifying, by the network monitoring device, a network anomaly in the determined network topology when the current response time deviates from the representative response time for the communication link interconnecting the one pair of nodes by a threshold amount;

wherein each of the latency distributions represents a statistical analysis of raw data points of paired response times for packets exchanged the pairs of nodes, wherein the latency values include an average or median latency of response time between nodes.

2. The method of claim 1, wherein the one pair of nodes includes a first node and a second node, the method further comprising:

determining, by the network monitoring device, the current response time substantially corresponds to a network path in the network topology that traverses one or more communication links interconnecting a third node of the plurality of nodes and at least one of the first node or the second node; and identifying the network anomaly as one of a link fault or a link failure for the communication link interconnecting the first node and the second node.

3. The method of claim 1, wherein the one pair of nodes includes a first node and a second node, the first node and the second node exchange the at least one message through one of a third node or a fourth node, the method further comprising:

determining, by the network monitoring device, the current response time substantially corresponds to a network path in the network topology that includes the fourth node and avoids the third node for the at least one message exchanged between the first node and the second node; and classifying the network anomaly as a device fault at the third node.

4. The method of claim 3; wherein the third node and the fourth node are network switches.

5. The method of claim 1, wherein the one or more latency distributions of response times include a first latency distribution of retransmission response times for the messages exchanged between the one pair of nodes, the method further comprising:

determining a representative retransmission response time for the communication link interconnecting the one pair of nodes;

determining a second latency distribution of retransmission response times for current messages exchanged between the one pair of nodes; and determining a deviation between the representative retransmission response time and at least a portion of the second latency distribution of retransmission response times; and classifying the network anomaly as a bit rate error for the communication link interconnecting the one pair of nodes.

6. The method of claim 1, wherein the one pair of nodes includes a first node and a second node, the method further comprising:

determining an aggregated representative response time for a network path in the network topology that includes the first node, the second node, and a third node disposed between the first node and the second node; and classifying the network anomaly as a buffer fault at the second node when the current response time deviates from the representative response time for the communication link interconnecting the one pair of nodes by a threshold amount and the current response time fails to substantially correspond to the aggregated representative response time for the network path in the network topology.

7. The method of claim 1, wherein determining the one or more latency distributions further comprises determining the one or more latency distributions of response times for messages having a specific attribute.

8. The method of claim 1, wherein determining the one or more latency distributions further comprises determining the one or more latency distributions of response times for messages based on time stamp data associated with each message.

9. The method of claim 1, wherein the representative response time for each communication link of the one or more communication links is one of a median response time or an average response time based on the one or more latency distributions.

10. The method of claim 1, wherein the monitoring device includes a plurality of distributed monitoring modules operable by one or more node of the plurality of nodes in the data center network.

11. A monitoring device, comprising:

one or more network interfaces to communicate within a data center network;

a processor coupled to the network interfaces and adapted to execute one or more processes; and a memory configured to store a process executable by the processor, the process when executed operable to:

monitor a plurality of nodes in a data center network, the plurality of nodes being arranged in a network topology of one or more communication links interconnecting nodes of the plurality of nodes and a relative position for each node of the plurality of nodes;

determine one or more latency distributions of response times for messages exchanged between pairs of nodes of the plurality of nodes;

creating a map of the network topology of the plurality of nodes based on a statistical analysis of the one or more latency distributions of raw paired response times that are representative of latency values, which corresponds to expected response times and retransmission latency value to thereby determine the network topology;

determine a representative response time for each communication link of the one or more communication links based on the one or more latency distributions;

compare a current response time for at least one message exchanged between one pair of nodes to the representative response time for the communication link interconnecting the one pair of nodes; and identify a network anomaly in the determined network topology when the current response time deviates from the representative response time for the communication link interconnecting the one pair of nodes by a threshold amount;

wherein each of the latency distributions represents a statistical analysis of raw data points of paired response times for packets exchanged the pairs of nodes;

wherein the latency values include an average or median latency of response time between nodes.

12. The monitoring device of claim 11, wherein the one pair of nodes includes a first node and a second node, wherein the process, when executed is further operable to:

determine the current response time substantially corresponds to a network path in the network topology that traverses one or more communication links interconnecting a third node of the plurality of nodes and at least one of the first node or the second node; and identify the network anomaly as one of a link fault or a link failure for the communication link interconnecting the first node and the second node.

13. The monitoring device of claim 11, wherein the one pair of nodes includes a first node and a second node, the first node and the second node exchange the at least one message through one of a third node or a fourth node, wherein the process, when executed is further operable to:

determine the current response time substantially corresponds to a network path in the network topology that includes the fourth node and avoids the third node for the at least one message exchanged between the first node and the second node; and classify the network anomaly as a device fault at the third node.

14. The monitoring device of claim 11, wherein the one or more latency distributions of response times include a first latency distribution of retransmission response times for the messages exchanged between the one pair of nodes, wherein the process, when executed is further operable to:

determine a representative retransmission response time for the communication link interconnecting the one pair of nodes;

determine a second latency distribution of retransmission response times for current messages exchanged between the one pair of nodes;

determine a deviation between the representative retransmission response time and at least a portion of the second latency distribution of retransmission response times; and classify the network anomaly as a bit rate error for the communication link interconnecting the one pair of nodes.

15. The monitoring device of claim 11, wherein the one pair of nodes includes a first node and a second node, wherein the process, when executed is further operable to:

determine an aggregated representative response time for a network path in the network topology that includes the first node, the second node, and a third node disposed between the first node and the second node; and classify the network anomaly as a buffer fault at the second node when the current response time deviates from the representative response time for the communication link interconnecting the one pair of nodes by a threshold amount and the current response time fails to substantially correspond to the aggregated representative response time for the network path in the network topology.

16. The monitoring device of claim 11, wherein the representative response time for each communication link of the one or more communication links is one of a median response time or an average response time based on the one or more latency distributions.

17. The monitoring device of claim 11, further comprising a plurality of distributed monitoring modules operable by one or more nodes in the data center network.

18. A tangible, non-transitory, computer-readable media having software encoded thereon, the software, when executed by a processor, operable to:

monitor a plurality of nodes in a data center network, the plurality of nodes being arranged in a network topology of one or more communication links interconnecting nodes of the plurality of nodes and a relative position for each node of the plurality of nodes;

determine one or more latency distributions of response times for messages exchanged between pairs of nodes of the plurality of nodes;

creating a map of the network topology of the plurality of nodes based on a statistical analysis of the one or more latency distributions of raw paired response times that are representative of latency values, which corresponds to expected response times and retransmission latency values to thereby determine the network topology;

determine a representative response time for each communication link of the one or more communication links based on the one or more latency distributions;

compare a current response time for at least one message exchanged between one pair of nodes to the representative response time for the communication link interconnecting the one pair of nodes; and identify a network anomaly in the determined network topology when the current response time deviates from the representative response time for the communication link interconnecting the one pair of nodes by a threshold amount;

wherein each of the latency distributions represents a statistical analysis of raw data points of paired response times for packets exchanged the pairs of nodes;

wherein the latency values include an average or median latency of response time between nodes.

19. The tangible, non-transitory, computer-readable media of claim 18, wherein the one pair of nodes includes a first node and a second node, wherein the software, when executed by the processor, is further operable to:

determine the current response time substantially corresponds to a network path in the network topology that traverses one or more communication links interconnecting a third node of the plurality of nodes and at least one of the first node or the second node; and identify the network anomaly as one of a link fault or a link failure for the communication link interconnecting the first node and the second node.

20. The tangible, non-transitory, computer-readable media of claim 18, wherein the representative response time for each communication link of the one or more communication links is one of a median response time or an average response time based on the one or more latency distributions.

* * * * *